United States Patent
Rajwar et al.

(10) Patent No.: US 9,535,744 B2
(45) Date of Patent: Jan. 3, 2017

(54) METHOD AND APPARATUS FOR CONTINUED RETIREMENT DURING COMMIT OF A SPECULATIVE REGION OF CODE

(71) Applicant: Intel Corporation, Santa Clara, CA (US)

(72) Inventors: Ravi Rajwar, Portland, OR (US); Matthew C. Merten, Hillsboro, OR (US); Christine E. Wang, Portland, OR (US); Vijaykumar B. Kadgi, Portland, OR (US); Rajesh S. Parthasarathy, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 536 days.

(21) Appl. No.: 13/931,860

(22) Filed: Jun. 29, 2013

(65) Prior Publication Data
US 2015/0006496 A1    Jan. 1, 2015

(51) Int. Cl.
G06F 9/46    (2006.01)
G06F 9/38    (2006.01)
G06F 9/52    (2006.01)

(52) U.S. Cl.
CPC ............. *G06F 9/467* (2013.01); *G06F 9/384* (2013.01); *G06F 9/3836* (2013.01); *G06F 9/3842* (2013.01); *G06F 9/3857* (2013.01); *G06F 9/3861* (2013.01); *G06F 9/3863* (2013.01); *G06F 9/466* (2013.01); *G06F 9/528* (2013.01)

(58) Field of Classification Search
None
See application file for complete search history.

(56) References Cited

U.S. PATENT DOCUMENTS

| 5,566,315 | A | | 10/1996 | Milillo et al. | |
|---|---|---|---|---|---|
| 5,655,098 | A | * | 8/1997 | Witt | G06F 9/30014 711/201 |
| 5,721,855 | A | * | 2/1998 | Hinton | G06F 9/30152 711/E12.049 |
| 5,911,776 | A | | 6/1999 | Guck | |
| 5,951,670 | A | * | 9/1999 | Glew | G06F 9/30098 712/200 |
| 6,085,199 | A | | 7/2000 | Rose | |

(Continued)

OTHER PUBLICATIONS

'Prototyping Architectural Support for Program Rollback Using FPGAs' by Radu Teodorescu and Josep Torrellas, Proceedings of the 13th Annual IEEE Symposium on Field-Programmable Custom Computing Machines, copyright 2005, IEEE.*

(Continued)

*Primary Examiner* — Steven Snyder
(74) *Attorney, Agent, or Firm* — Nicholson De Vos Webster & Elliott LLP

(57) ABSTRACT

A processor, system, and method are described for continued retirement of operations during a commit of a speculative region of program code. For example, one embodiment of a method comprises the operations of identifying a plurality of transactional memory regions in program code, including a first transactional memory region; and retiring one or more of a plurality of operations which follow the first transactional memory region even when a commit operation associated with the first transactional memory region is waiting to complete.

21 Claims, 19 Drawing Sheets

(56) References Cited

U.S. PATENT DOCUMENTS

| | | | |
|---|---|---|---|
| 6,094,716 A * | 7/2000 | Witt | G06F 9/30032 712/215 |
| 6,240,503 B1 * | 5/2001 | Witt | G06F 9/30101 711/200 |
| 6,393,442 B1 | 5/2002 | Cromarty et al. | |
| 6,549,918 B1 | 4/2003 | Probert et al. | |
| 7,472,260 B2 * | 12/2008 | Lien | G06F 9/30174 711/141 |
| 7,500,087 B2 * | 3/2009 | Saha | G06F 9/3004 712/235 |
| 7,613,908 B2 * | 11/2009 | Raikin | G06F 9/3004 712/218 |
| 7,962,730 B2 * | 6/2011 | Lien | G06F 9/30174 712/219 |
| 8,180,977 B2 | 5/2012 | Rajwar et al. | |
| 8,219,787 B2 * | 7/2012 | Lien | G06F 9/30174 712/219 |
| 8,418,156 B2 * | 4/2013 | Wang | G06F 9/3834 712/245 |
| 2003/0061439 A1 | 3/2003 | Shau | |
| 2004/0103268 A1 * | 5/2004 | Paulraj | G06F 9/3857 712/227 |
| 2004/0177239 A1 * | 9/2004 | Clift | G06F 9/384 712/228 |
| 2006/0161740 A1 * | 7/2006 | Kottapalli | G06F 9/528 711/152 |
| 2006/0248320 A1 * | 11/2006 | Chin | G06F 9/3836 712/241 |
| 2007/0260942 A1 * | 11/2007 | Rajwar | G06F 9/526 714/54 |
| 2008/0024834 A1 | 1/2008 | Matsui | |
| 2008/0065864 A1 | 3/2008 | Akkary et al. | |
| 2008/0244544 A1 | 10/2008 | Neelakantam et al. | |
| 2008/0288819 A1 * | 11/2008 | Heller, Jr. | G06F 9/3004 714/19 |
| 2009/0217013 A1 * | 8/2009 | Caprioli | G06F 9/30123 712/228 |
| 2010/0042868 A1 | 2/2010 | Apelbaum et al. | |
| 2010/0165032 A1 | 7/2010 | Yoshida | |
| 2010/0169579 A1 | 7/2010 | Sheaffer et al. | |
| 2011/0145551 A1 * | 6/2011 | Wang | G06F 9/3834 712/225 |
| 2011/0208921 A1 * | 8/2011 | Pohlack | G06F 9/467 711/147 |
| 2011/0296399 A1 | 12/2011 | Tugnawat et al. | |
| 2012/0005461 A1 * | 1/2012 | Moir | G06F 9/3857 712/228 |
| 2012/0030518 A1 | 2/2012 | Rajwar et al. | |
| 2012/0075319 A1 | 3/2012 | Dally | |
| 2012/0128241 A1 | 5/2012 | Jung | |
| 2012/0304002 A1 | 11/2012 | Chen et al. | |
| 2012/0304178 A1 | 11/2012 | Grove et al. | |
| 2013/0335756 A1 | 12/2013 | Bhaskaran et al. | |
| 2014/0156933 A1 * | 6/2014 | Shaikh | G06F 12/0875 711/123 |
| 2014/0189315 A1 * | 7/2014 | Rajwar | G06F 9/30145 712/216 |
| 2015/0378731 A1 * | 12/2015 | Lai | G06F 9/30174 712/30 |
| 2016/0170770 A1 * | 6/2016 | Cain, III | G06F 9/30109 712/219 |

OTHER PUBLICATIONS

'Speculation-Based Techniques for Transactional Lock-Free Execution of Lock-Based Programs' by Ravi Rajwar, A dissertation submitted in partial fulfillment of the requirements for the degree of Doctor of Philosophy (Computer Sciences) at the University of Wisconsin—Madison, 2002.*
'Computer Architecture Lecture 10: Out-of-Order Execution' by Professor Onur Mutlu, Carnegie Mellon University, Fall 2011.*
'CSE 502: Computer Architecture—Instruction Commit' from Stony Brook University, archived on Jan. 14, 2015.*
Office Action for counterpart U.S. Appl. No. 13/566,421, mailed Jan. 15, 2015, 15 pages.
Office Action for counterpart U.S. Appl. No. 13/566,421, mailed Jun. 19, 2015, 17 pages.
"Yuv," by Wikipedia (Jul. 28, 2011 revision). Available at https://en.wikipedia.org/w/index.php?title=YUV&oldid=441795719.
"How to convert 16-bit 565 rgb value to 32 bit," by anuragkhanna8. In: Bytes IT Community (Oct. 20, 2006). Available at: http://bytes.com/topic/c/answers/552128-how-convert-16-bit-565-rgb-value-32-bit.
"Texture tiling and swizzling," by the Ryg Blog (Jan. 17, 2011). Available at https://fgiesen.wordpress.com/2011/01/17/texture-tiling-and-swizzling/.
"Image tile formats," by Wikipedia (Jul. 23, 2011 revision). Available at: https://en.wikipedia.org/w/index.php?title-Image_file_formats&oldid-440938301n.
Office Action for counterpart U.S. Appl. No. 13/691,218, mailed Dec. 9, 2014, 17 pages.
Office Action for counterpart U.S. Appl. No. 13/691,218, mailed Sep. 10, 2015, 13 pages.
Final Office Action for counterpart U.S. Appl. No. 13/691,218, mailed Mar. 23, 2015, 17 pages.
International Search Report and Written Opinion for foreign counterpart Application No. PCT/US2013/045982, mailed Sep. 30, 2013, 9 pages.
InternationalPreliminary Report on Patentability for foreign counterpart Application No. PCT/US2013/045982, mailed Jun. 11, 2015, 8 pages.
Final Office Action for counterpart U.S. Appl. No. 13/566,421, mailed Dec. 31, 2015, 20 pages.
Notice of Allowance for counterpart U.S. Appl. No. 13/566,421, mailed Mar. 15, 2016, 9 pages.
"Online Compression Caching," by Plaxton et al., In: SWAT 2008, pp. 414-425.
"Managing Persistent Objects in a Multi-Level Store," by Stonebraker, Michael. In: Proc. 1991 ACM SIGMOD Int'l Conf. Management of Data, 18 pages.
Notice of Allowance for counterpart for U.S. Appl. No. 13/691,218, mailed Feb. 29, 2016, 9 pages.

* cited by examiner

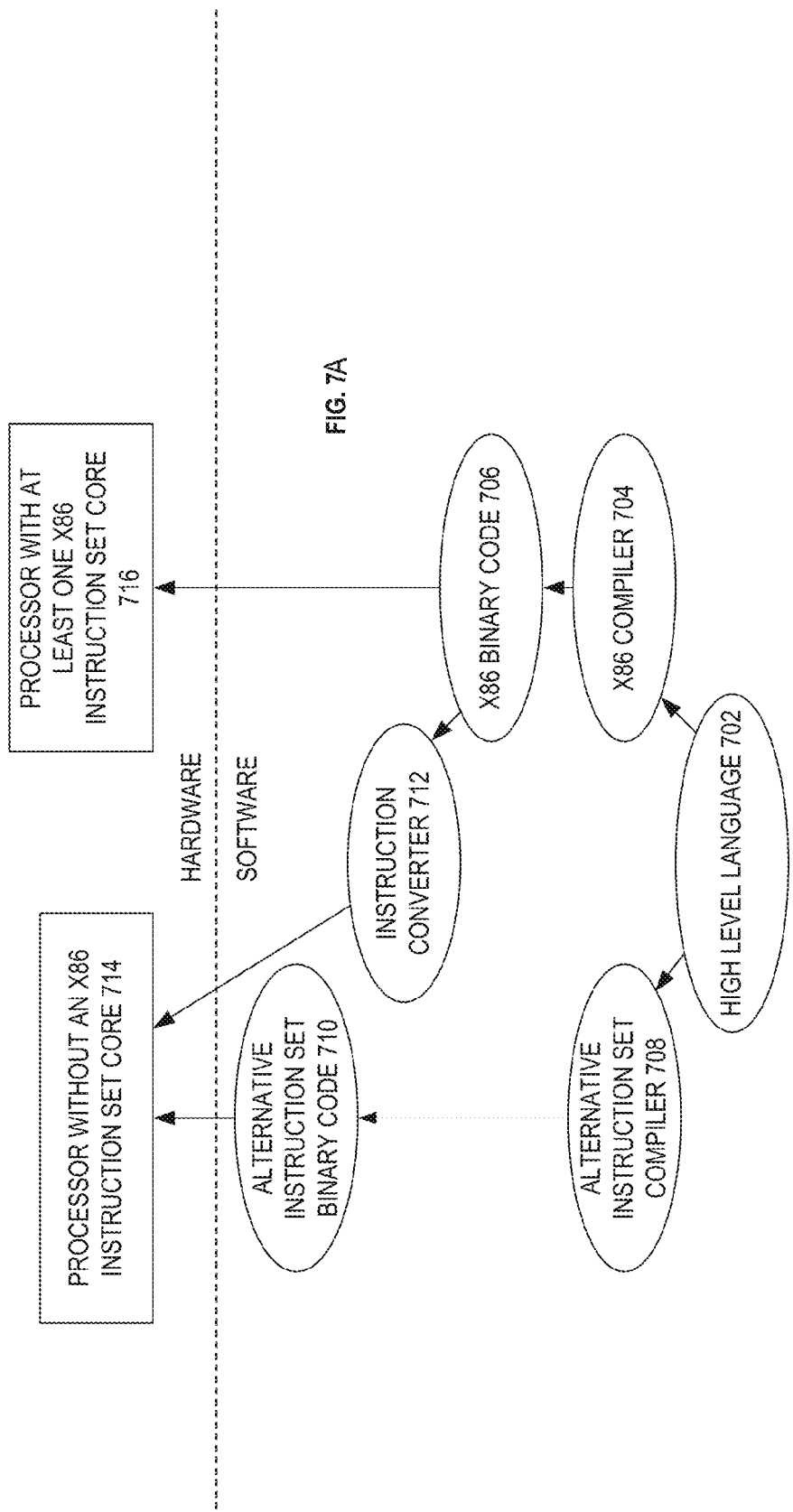

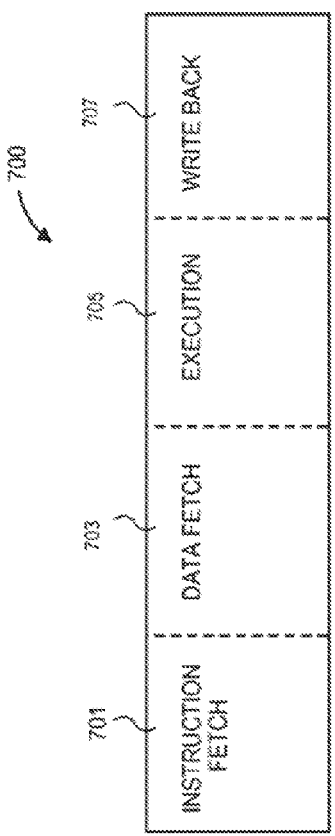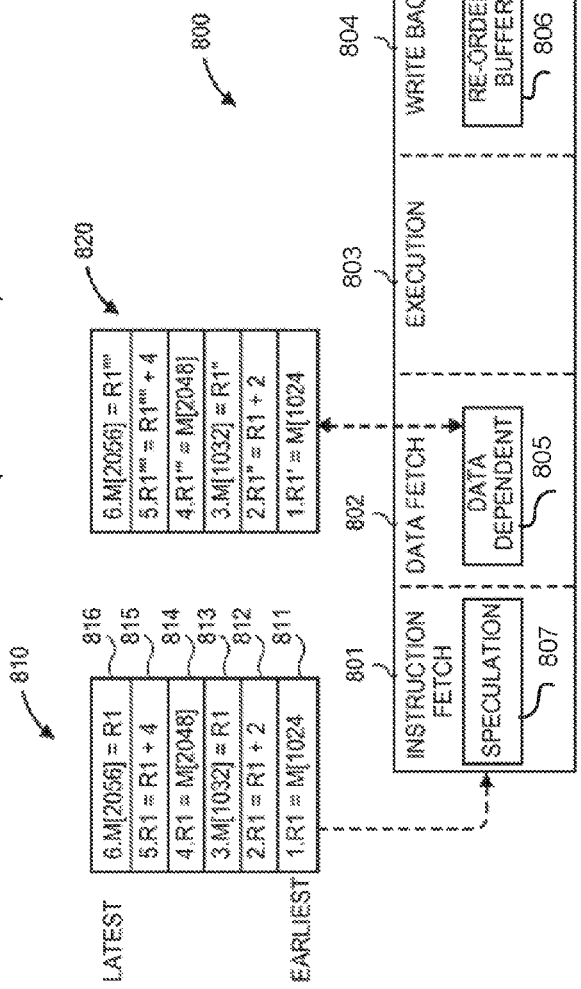
FIG. 7B
(PRIOR ART)
FIG. 8
(PRIOR ART)

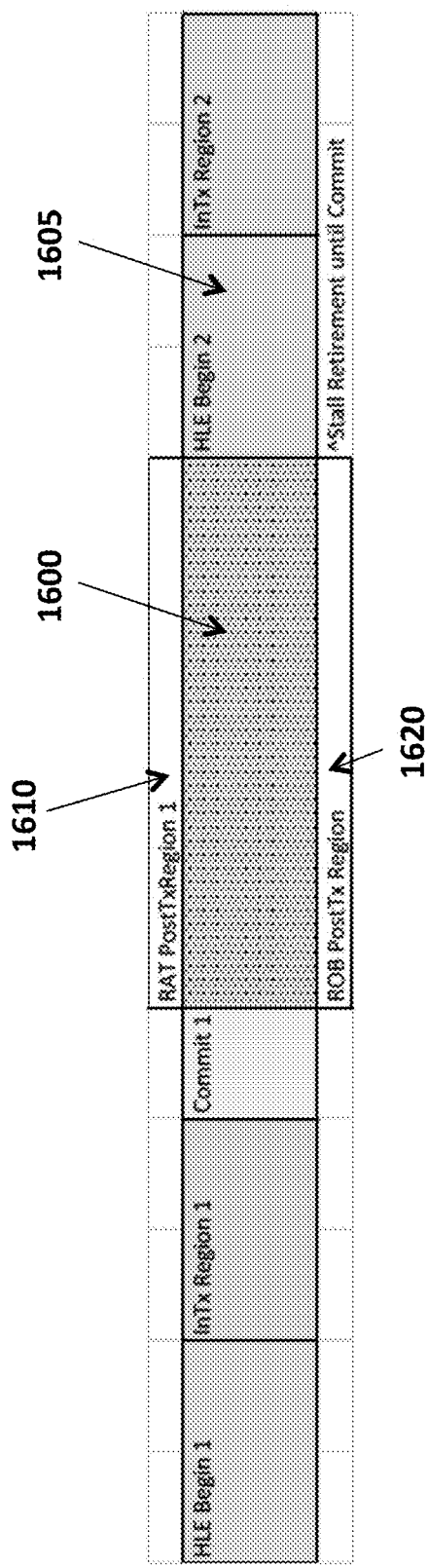
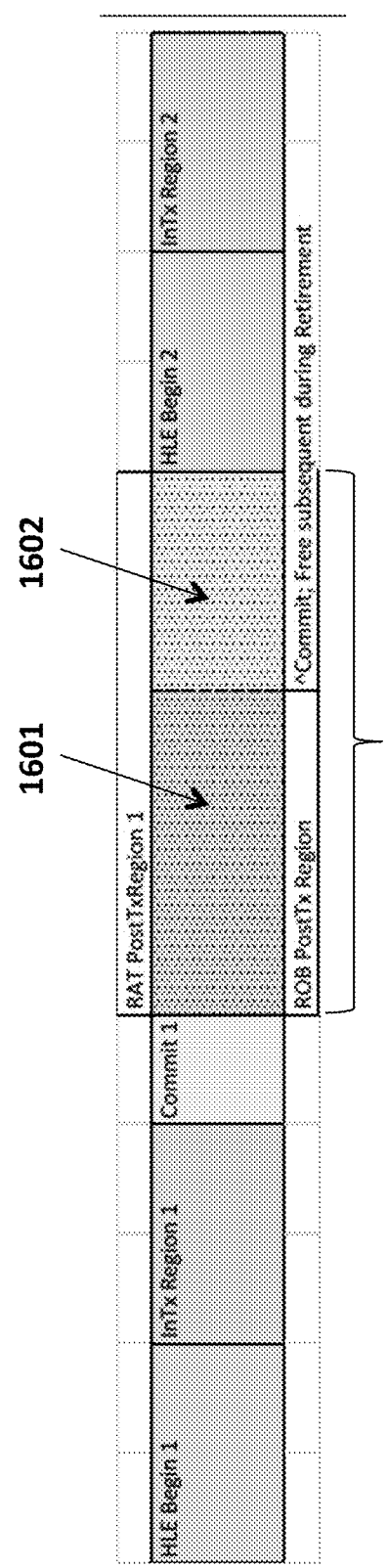
FIG. 16A
FIG. 16B

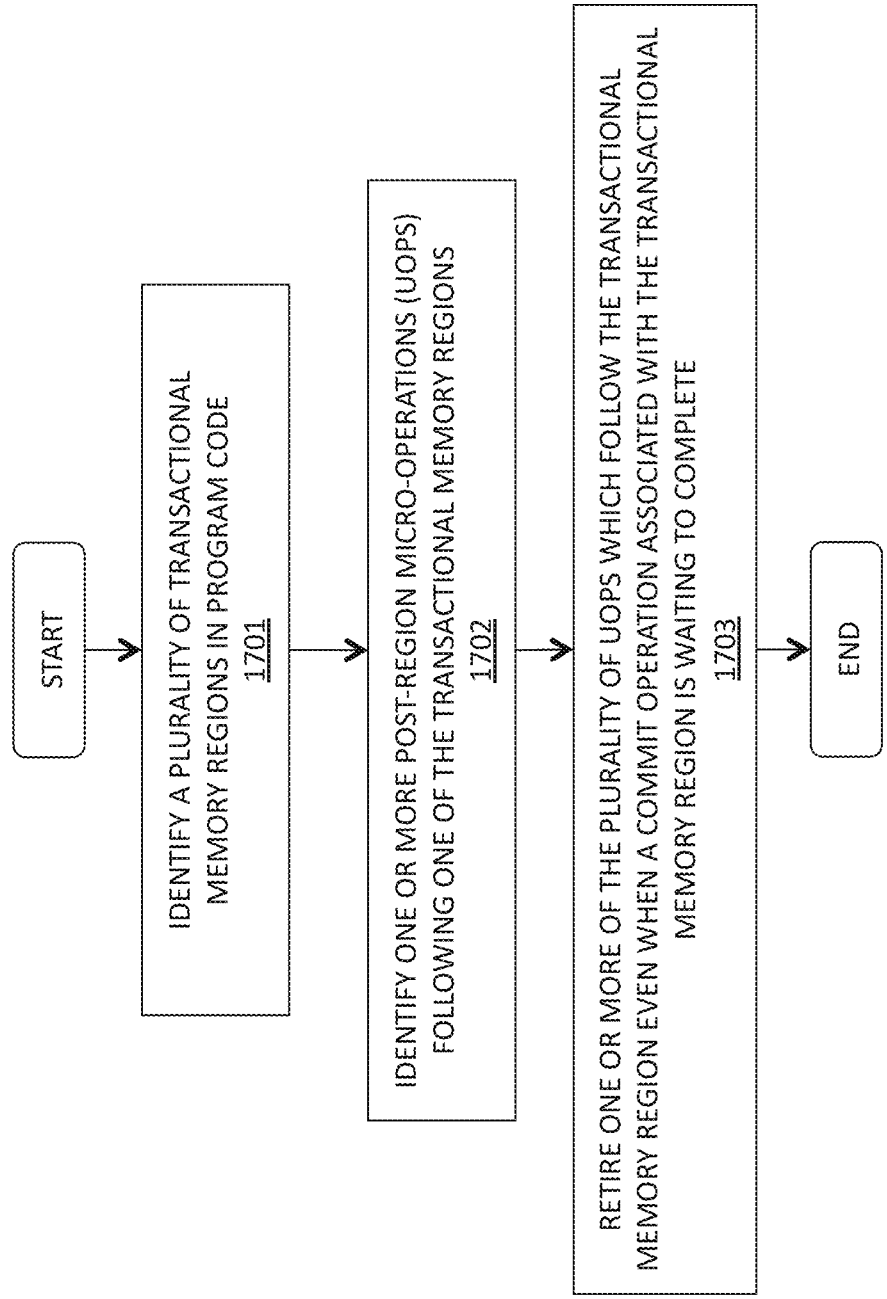

METHOD AND APPARATUS FOR CONTINUED RETIREMENT DURING COMMIT OF A SPECULATIVE REGION OF CODE

BACKGROUND

Field of the Invention

This invention relates generally to the field of computer processors and software. More particularly, the invention relates to a method and apparatus for continued retirement during commit of a speculative region of code.

Description of the Related Art

In prior processor architectures, the reorder buffer (ROB) was forced to stall retirement when a region commit uop was the oldest until the memory system (MEU) was prepared to commit values altered in the region. This process caused the out-of-order speculation mechanism to get "backed up" while waiting for the MEU. That is, at the time the commit operation is at the head of the ROB and ready to retire, its retirement is held back, thus preventing the ROB from retiring and speculating deeper into code subsequent to the region. Delay in the retirement of the commit causes delay in the retirement of subsequent uops, which delays releasing resources causing yet other sources of delay.

BRIEF DESCRIPTION OF THE DRAWINGS

A better understanding of the present invention can be obtained from the following detailed description in conjunction with the following drawings, in which:

FIGS. 7A-7B illustrates a block diagram contrasting the use of a software instruction converter to convert binary instructions in a source instruction set to binary instructions in a target instruction set according to embodiments of the invention;

FIG. 8 shows a pipeline that can execution instructions out-of-order and execute instructions speculatively;

FIG. 11a shows logic circuit components for performing the process of FIG. 10a;

FIGS. 16a-c illustrate the timing of exemplary transactional memory region commits and instruction retirements;

FIG. 17 illustrates a method in accordance with one embodiment of the invention.

DETAILED DESCRIPTION

Figure 1:
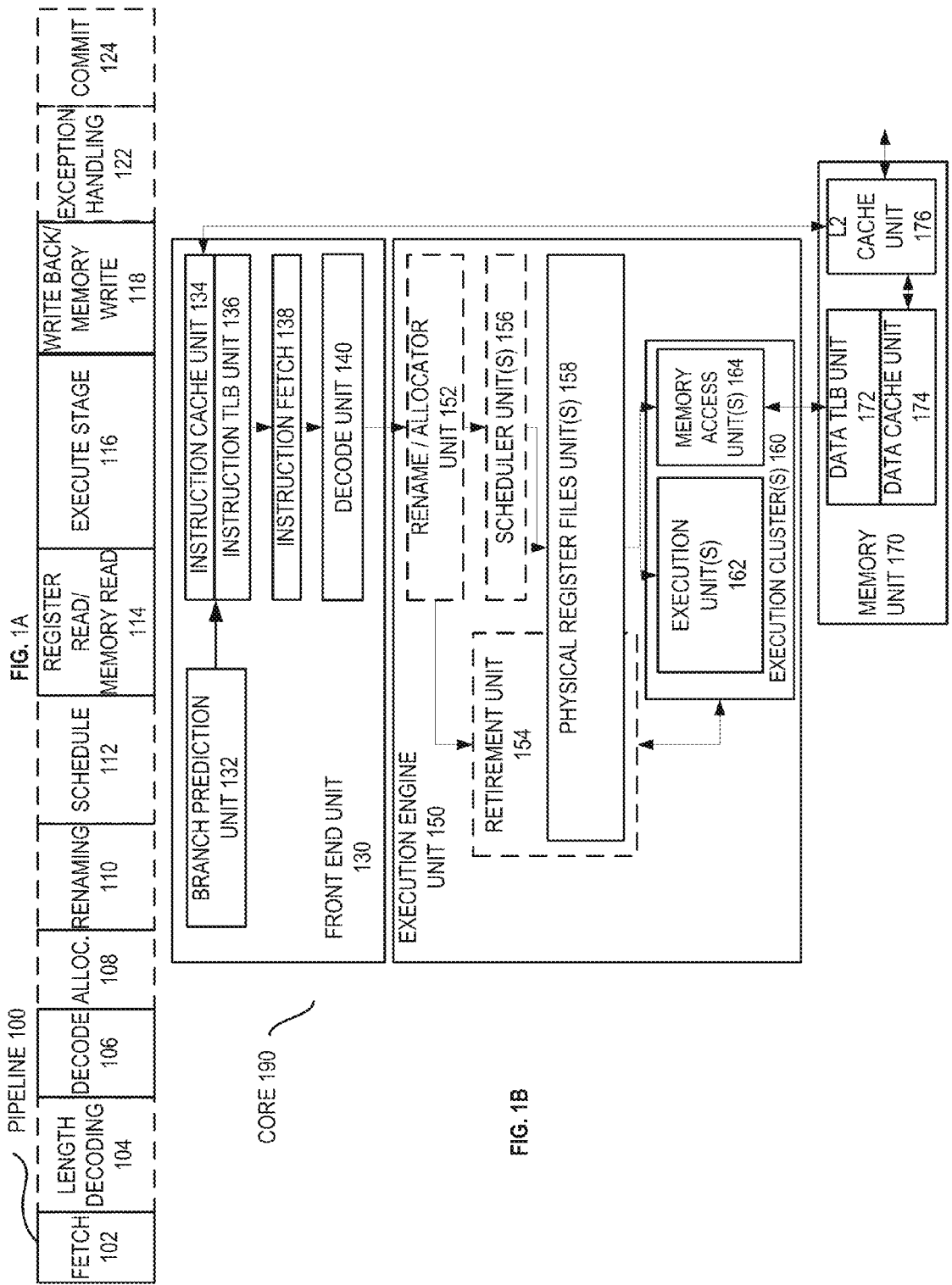
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB)

136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
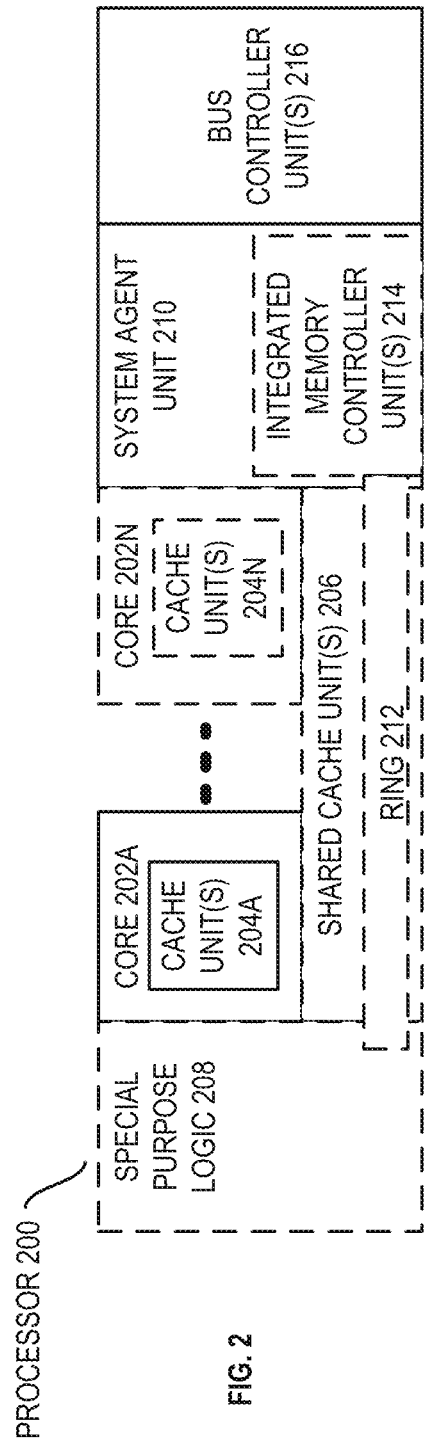
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
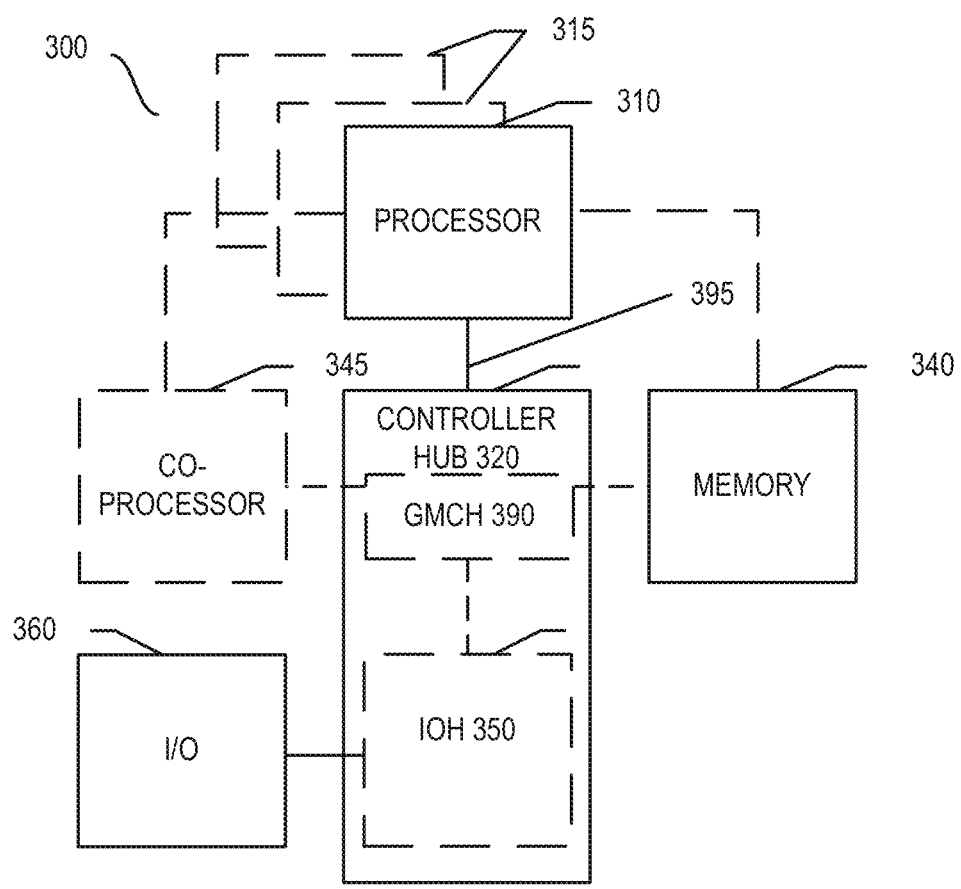
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
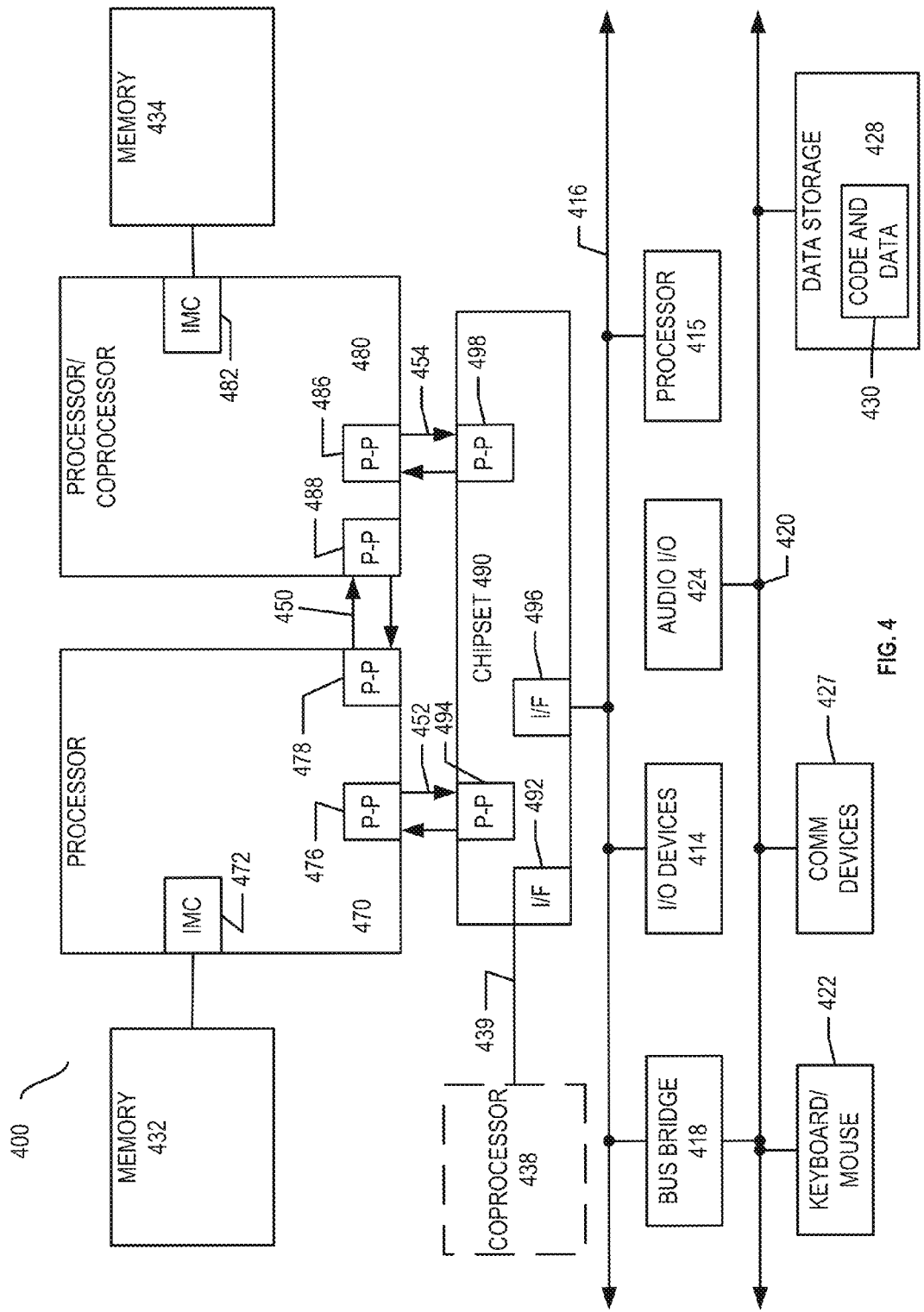
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively.

Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
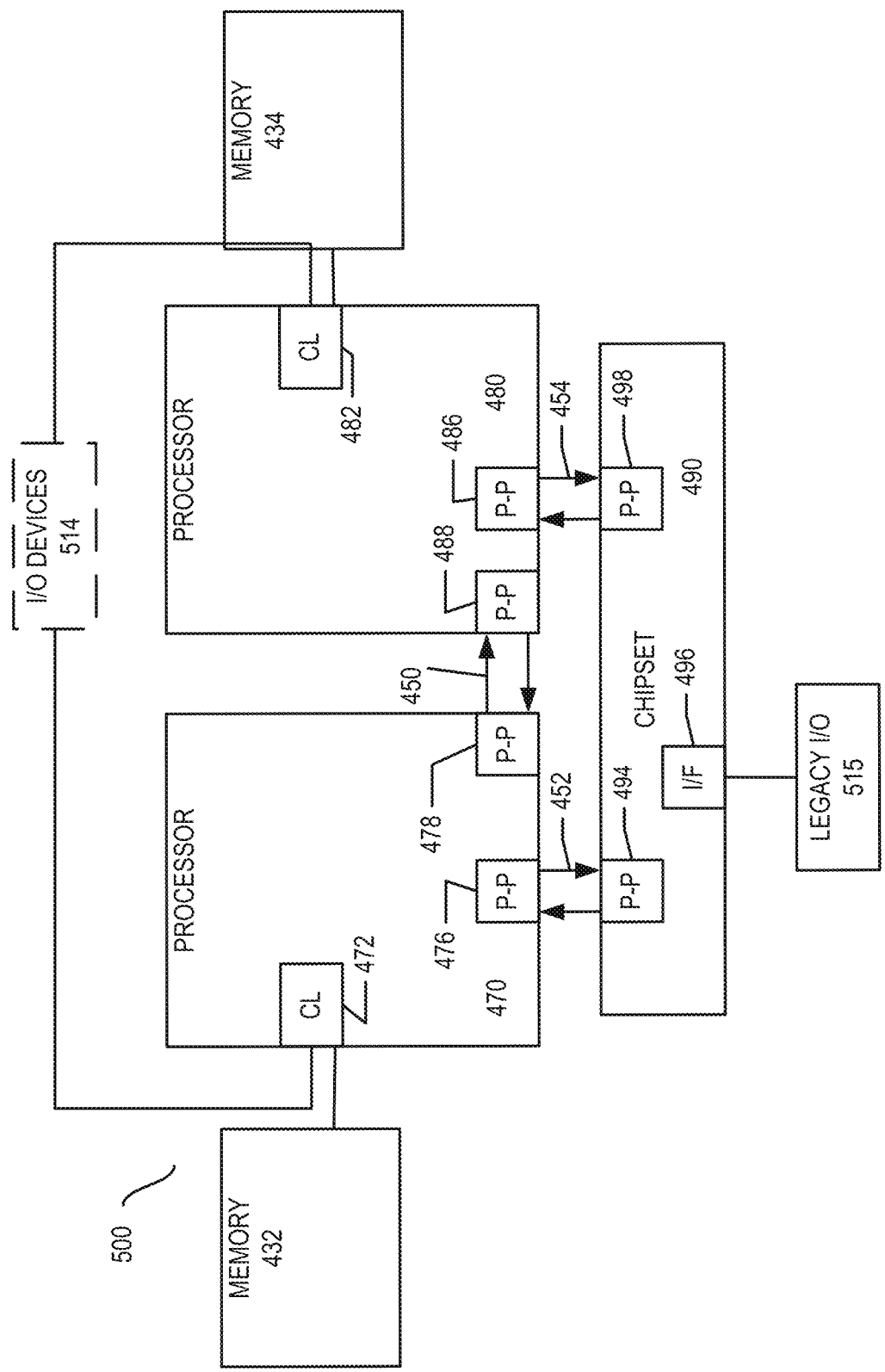
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
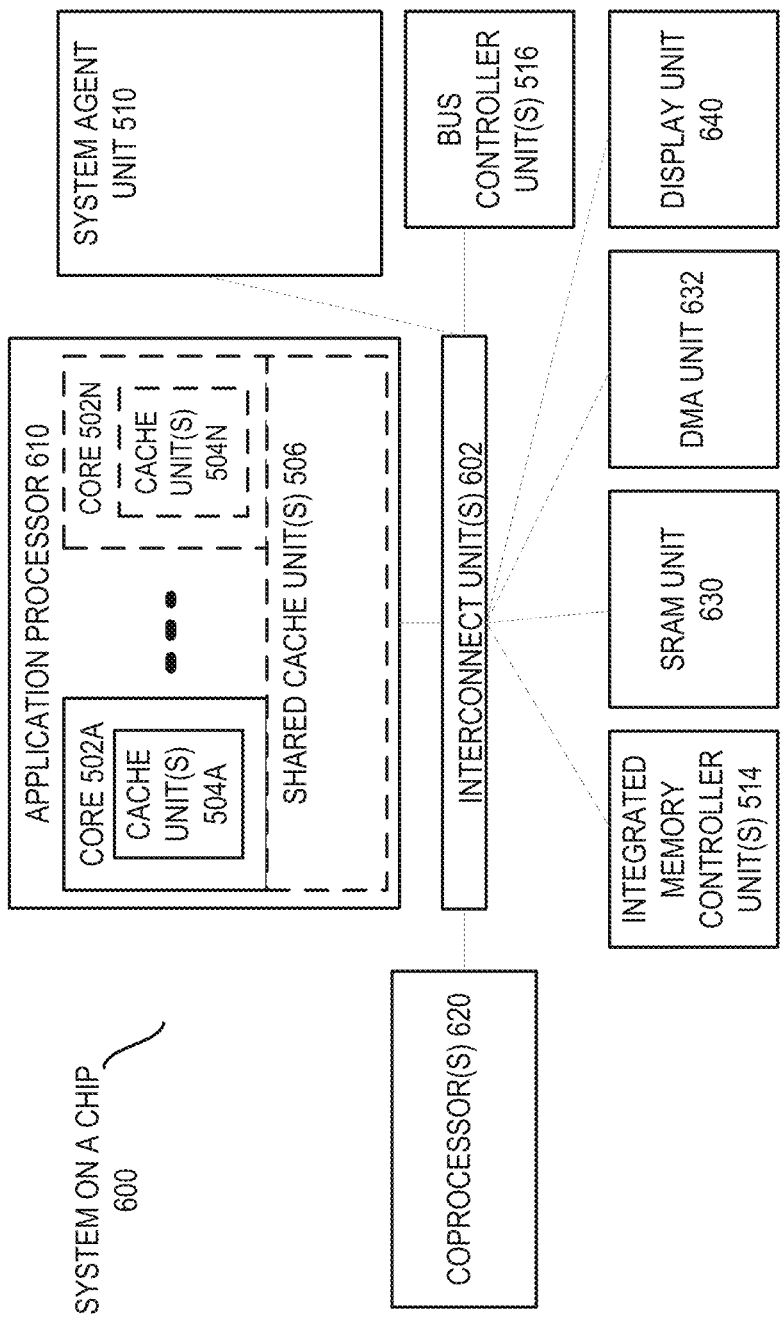
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Method and Apparatus for Continued Retirement During Commit of a Speculative Region The embodiments of the invention described below provide a mechanism to allow continued retirement of instructions during a commit of a speculative region of program code. Specifically, one embodiment allows the retirement of instructions to proceed through the commit micro-operation (hereinafter "uop") into post-region code even if the memory execution unit (MEU) has not committed the region yet. In this embodiment, the uops that follow a region may be considered to be part of the region itself. When retirement is allowed to proceed past the commit uop, but yet the region subsequently aborts because of a memory issue, the architectural register values must be restored to the point at the beginning of the region, throwing out both the region and post-region execution. This new mode ends when one of several conditions arises. First, if a new region begin is ready to retire, retirement must stall until the previous region is ready to commit otherwise extra tracking is required for two regions to be in the process of committing simultaneously, which is added complexity especially in the MEU. Second, if a uop comes up for retirement that is not allowed inside of a region because its retirement cannot be undone by the copy-on-write (COW) mechanism described below, retirement must stall. Third, if the region actually commits, and there are no additional regions inside the conventional speculation mechanism, treating subsequent code as being inside the region is no longer necessary (this is referred to as "free and clear").

The COW mechanism implemented in one embodiment of the invention will first be described with reference to FIGS. 8-14, followed by a detailed description of techniques for continued retirement during commit of a speculative region of code.

As observed in FIG. 8, an instruction sequence 810 executed by an instruction execution pipeline is composed of a series of instructions that a compiler or programmer has determined should be executed in the order the instructions are presented to the pipeline. Here, registers R1 and R2 are understood to be architectural registers as they are specifically called out and comprehended by the program code. Often, the resultant of an earlier instruction is used as an input operand for a later instruction. For example, the resultant R1 of instruction 811 is used as an input operand for instruction 812. In this sense, instruction 812 can be said to have "a dependency" on instruction 811. That is, instruction 812 can not be executed in the execution stage 803 until instruction 811 is executed and its resultant retired. Instruction 813 is also observed to have a dependency on instruction 812.

By contrast, instructions 814 through 816 do not have any dependency on instructions 811 through 813 (instruction sequence 814 through 816 processes data from memory location M[2048] and writes memory location M[2056] which is different than instruction sequence 811 through 813 which processes data from memory location M[1024] and writes memory location M[1032]). Strict in order execution of the instruction sequence 810 will therefore lead to a drop off in performance if delay is encountered fetching the data for instruction 811. As it turns out, the input operand for instruction 811 needs to be fetched from system memory (which is a time wasteful process). As such, all of instructions 812 through 816 must wait until the data for instruction 811 has been retrieved from system memory if instruction sequence 810 is to be processed strictly in order.

In order to avoid the unnecessary delay of an instruction that does not have any dependencies on earlier "in flight" instructions, many modern instruction execution pipelines have enhanced data fetch and write back stages to effect "out-of-order" execution. Here, the data fetch stage 802 of pipeline 800 is enhanced to include data dependency logic 805 to recognize when an instruction does not have a dependency on an earlier in flight instruction, and, permit its issuance to the instruction execution stage 803 "ahead of", e.g., an earlier instruction whose data has not yet been fetched. Typically, physical registers as opposed to architectural registers are used to support the out-of-order execution.

Moreover, the write-back stage 804 is enhanced to include a re-order buffer 806 that re-orders the results of out-of-order executed instructions into their correct order, and, delays their retirement to the architectural register file at least until a correctly ordered consecutive sequence of instruction execution results have retired. Note that in a physical register-based out-of-order machine, the retirement of values to the architectural register file does not involve a copy of the data, but rather a proper management of the mapping between the architectural register ID and the physical register holding the value.

The enhanced instruction execution pipeline is also observed to include instruction speculation logic 807 within the instruction fetch stage 801. Instruction sequences branch out into different paths depending on a condition such as the value of a variable. The speculation logic 807 studies the upcoming instruction sequence, guesses at what conditional branch direction or jump the instruction sequence will take (it has to guess because the condition that determines the branch direction or jump may not have executed or retired yet) and begins to fetch the instruction sequence that flows from that direction or jump. The speculative instructions are then processed by the remaining stages of the execution pipeline 800.

Here, the re-order buffer 806 of the write back stage 804 will delay the retirement of the results of the speculatively executed instructions until there is confirmation that the original guess made by the speculation logic 807 was correct. Once confirmation is made that the guess was correct, the results are retired to the architectural register file. If it turns out the guess was wrong, results in the re-order buffer 806 for the speculative instructions are discarded ("flushed") as is the state of any in flight speculative instructions within the pipeline 800. The pipeline 800 then re-executes from the branch/jump target with the correct sequence of instructions.

Here, instructions must be retired to the architectural register file in order so that stores write to the memory system in the proper order. If execution is stopped for any reason (such as an exception or user breakpoint or interrupt) the state of the retired architectural registers are consistent such that everything before the stopping point has been completed and nothing after the stopping point has been completed.

Traditionally, the size of the re-order buffer 806 determines the number of instructions that can execute out-of-order as well as execute speculatively. Here, the re-order buffer 806 acts as a kind of temporary queue for the results of instructions that have been executed by the execution stage 803, but, are not yet able to be retired. This kind of speculation can be referred to as "traditional speculation".

Figure 9:
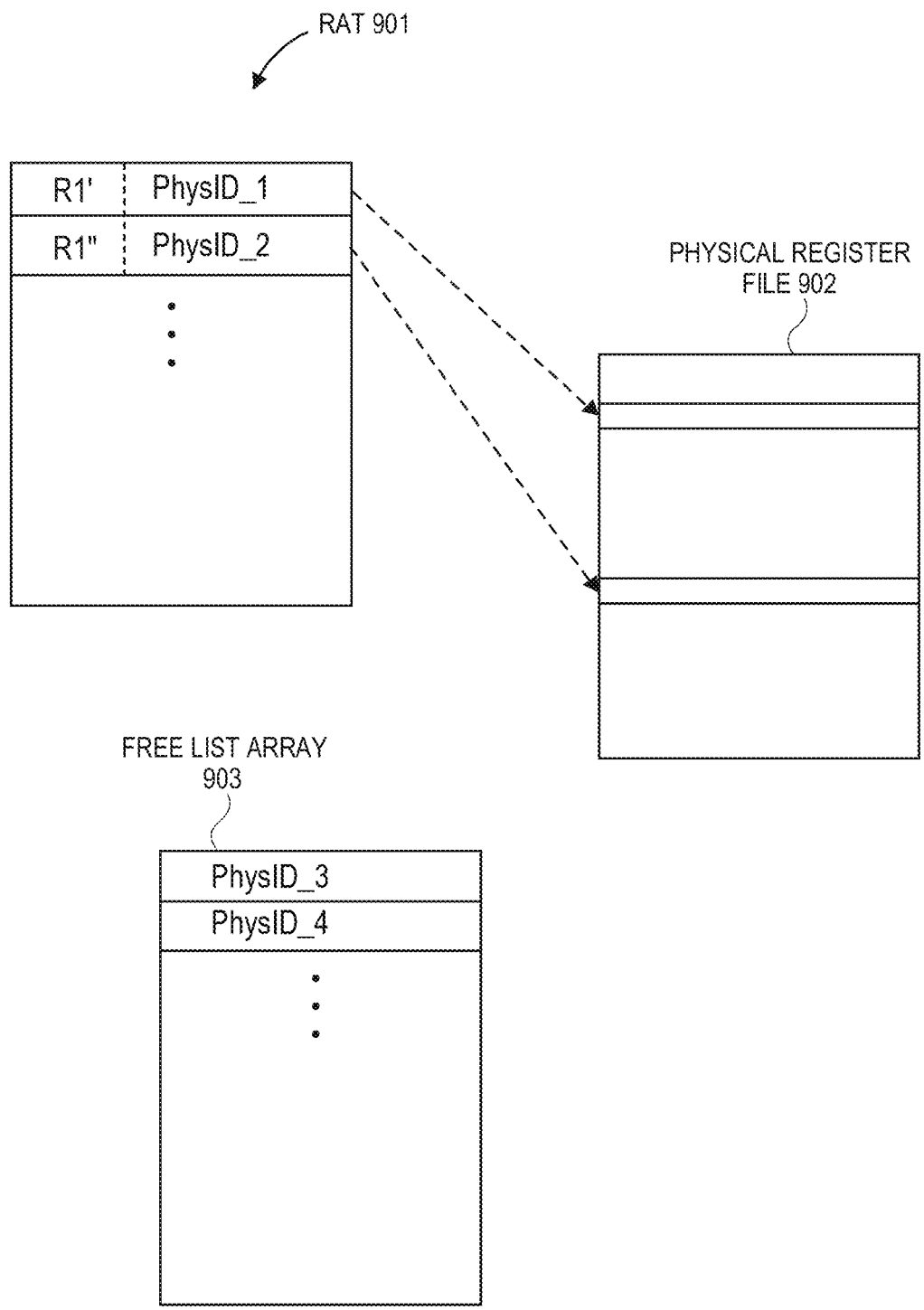
FIG. 9 shows an embodiment of components of data dependency logic circuitry.

FIG. 9 shows pertinent design features of the data dependency logic 805 of the pipeline 800 of FIG. 8. Referring to FIGS. 8 and 9, note that original instruction sequence 810 calls out architectural register R1. Data dependency logic 805 will recognize that: 1) instructions 814, 815 and 816 do not depend on instructions 811, 812 and 813; and, 2) if instructions 814, 815, and 816 are to be executed before or commensurate with instructions 811, 812 and 813 (to effect out-of-order execution), then, in order to calculate the correct resultants, registers other than architectural register R1 need to be referred to (e.g., R1', R1", R1''', R1'''' as discussed below). As such, data dependency logic 805 performs "register renaming" to rename, or map, where appropriate to effect out-of-order execution, the specific architectural registers called out by the original program code to a larger set of "physical registers".

As observed in FIG. 8 and the architectural register R1 called out by original code sequence 810 of FIG. 8 (R1) is renamed 820 to registers R1', R1", R1''', R1''''. Here, note that renaming can typically be viewed as a form of versioning where R1' is viewed as the older version of architectural register R1" and R1" is viewed as the older version of architectural register R1''', etc.

Renamed registers R1' through R1'''' are, in turn, mapped to physical registers. For simplicity, FIG. 9 only shows the mapping of registers R1' and R1" to Phys_ID_1 and Phys_ID_2. Here, a Register Alias Table (RAT) 901 contains a mapping of the renamed registers R1', R1" to the corresponding physical registers Phys_ID_1, Phys_ID_2 that are used to actually implement the renamed registers R1', R1". The RAT 901 essentially contains a listing of the specific physical registers that the data fetch stage has allocated for the corresponding renamed registers of the instructions that are being processed by the pipeline ("in-flight") but have not yet retired. As observed in FIG. 9, the RAT 901 contains a mapping for each in flight renamed register, and, a corresponding physical address or pointer to its specific, corresponding register in the physical register file 902. Note that RAT 901 represents the correct mapping to the physical registers for the point in the program that is currently allocating into the processor, as well as mappings for older versions of an architectural register that is still in flight, and further contains the mapping for the retired version of the architectural register. The specific structures used to track all in flight renamed versions of an architectural register may vary from embodiment to embodiment.

A free list array 903 also contains a list of pointers to registers in the physical register file 902 whose corresponding register data is not associated with any version of an architectural register including the retired version, or otherwise can be overwritten.

Here, logic circuitry within the data dependency logic 805 (and/or within the write back stage 804) is designed to recognize when no further dependencies exist on an architectural register entered in the RAT 901. Again, typically, the program code that is presented to the pipeline assumes that the pipeline will process the program code strictly in order. As such, a signature within the original program code (i.e., before renaming) that a register is holding information that no following instructions depend on is the first occurrence of an instruction that overwrites the register with new information from memory or another register. Instruction 814 of instruction sequence 810 of FIG. 8 has this property. Such instructions may be viewed as belonging to a class of instructions referred to as "overwriter" instructions.

Upon the retirement of an overwriter instruction, the entry in the RAT 901 for the retired version of the corresponding architectural register that was overwritten in the original code is flushed from the RAT 901, and, the pointer to the physical register file 902 for the flushed entry is moved from the RAT 901 to the free list array 903. For example, when instruction 814 retires, R1''' becomes the retired version, and the previous retired version is no longer needed and can be moved to the free list. That is, renamed register R1" with PhysID_2 is no longer needed, and PhysID_2 can be moved to the free list.

When a new instruction is presented to the data fetch stage 802 for execution, new versions are created and thus new physical registers are allocated for the architectural registers written by the instruction. The new physical registers are allocated by taking pointers from the free list array 903 and creating a mapping from architectural register to the physical register in the RAT 901.

In the case of speculative execution, data dependency logic 805 also has the ability to restore the RAT 901 back to its state at the branch or jump whose direction was incorrectly guessed, or back to the retired values if the machine nukes (that is, the entire pipeline is cleared or flushed).

Recalling that, traditionally, a re-order buffer will retire instruction results to the architectural register file when a series of results are realized in correct sequence order. Physical (actual) registers are written to at execution time. These same registers are deemed 'architectural' when they retire. Depending on implementation, the contents of a retired register could be copied over to an actual architectural register, or simply remain in the physical register file but managed or otherwise tracked as the architectural version vs speculative/physical versions within the RAT.

Moreover, recall that the size of the re-order buffer traditionally sets a limit on the number of instructions that can be executed out-of-order or speculatively. More advanced pipelines are presently being designed to support more aggressive speculation ("extended speculation") whose run length of speculative code can be (e.g., much) larger than the size of the re-order buffer.

In order to support extended speculative execution beyond the size of the reorder buffer, one perspective is that any extended speculative instruction stream may execute and even retire its results to the architectural register file and/or memory, so long as the state of the machine can be brought back to the correct (non-speculative) instruction stream if the speculation was incorrect. In an embodiment, in order to support extended speculative execution, the pipeline is configured to implement an "atomic" scale commitment process when committing extended speculatively executed code. In particular, the results of an entire self consistent region of extended speculative code (a "commit point") is concurrently committed to the true architectural state and/or memory ("commit the region").

In order to support this or other approaches where extended speculative results are actually retired to the architectural register file and/or memory, the RAT and free array list should be designed to prevent the overwriting of information that existed in the physical register file for each of the architectural registers consistent with a program point just before speculation first started (e.g., content within the physical register file for each of the architectural registers consistent with a program point as of the end of non speculation). The corpus of physical register space that is pointed to by the entries in the free list array at the time speculation started is free to be used by the speculative code going forward. However, precautions should be taken to make sure that the corpus of physical register space that is pointed to by the entries in the RAT for each of the architectural registers consistent with a program point when speculation starts should not be overwritten by the speculative code. By so doing, if the code needs to fall back and re-start from the point just before the start of speculation, the state of the program code for each of the architectural registers at the point can be recalled. That is, if a physical register holds a value that is needed after a fall back operation, even if the value is no longer associated with any active version of an architectural register during traditional speculation including the architecturally retired version, the physical register must be preserved.

Thus, in an embodiment, the start of extended speculation is marked and the program code progresses speculatively. As discussed above, in the case of extended speculation instructions are permitted to retire to architectural state.

Recall from the background that, typically, the program code that is presented to the pipeline assumes that the pipeline will process the program code strictly in order. As such, the signature within the original program code (i.e., before renaming) that a register is holding information that no following instructions depend on is the first occurrence of an overwriter instruction.

In the case of extended speculative execution, the speculatively executed code is apt to reach (potentially multiple times, once for each architectural register that is represented in the RAT) a region where a physical register file register that was "live" at the moment speculation started (i.e., there were potential dependences on its associated information) no longer has any dependencies on it. For example, the speculatively executed code is apt to present the pipeline with an "overwriter" instruction that intends to overwrite the information associated with an architectural register. During allocation a new version of that architectural register is created, thus replacing as current an earlier version of a renamed register. The earlier version has an entry in the RAT that was carried over from the non speculative to speculative code regions.

Figure 10A:
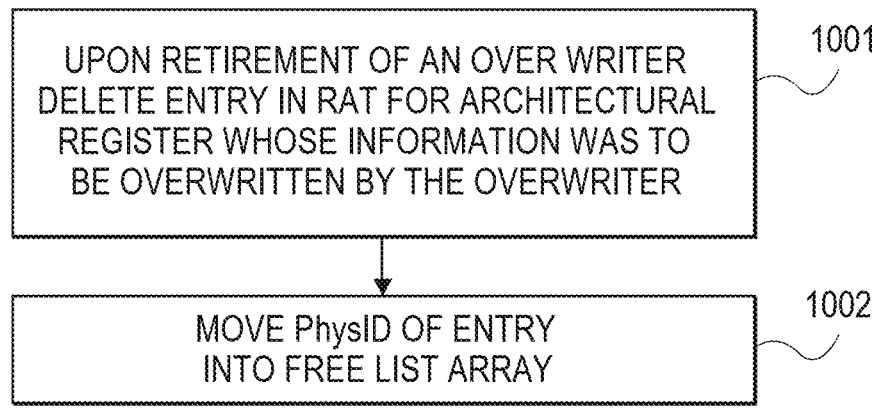
FIG. 10a shows a first process for entering a pointer to physical register space to a free list array.
Figure 10B:
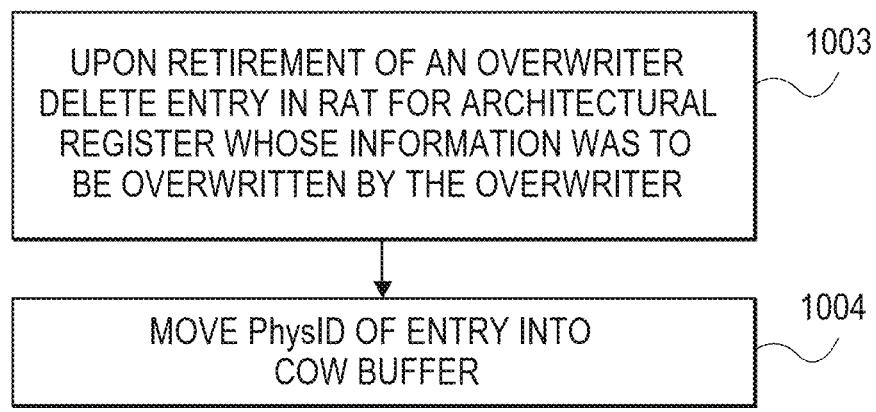
FIG. 10b shows a second process for entering a pointer to physical register space to a carry over write buffer.
Figure 11A:
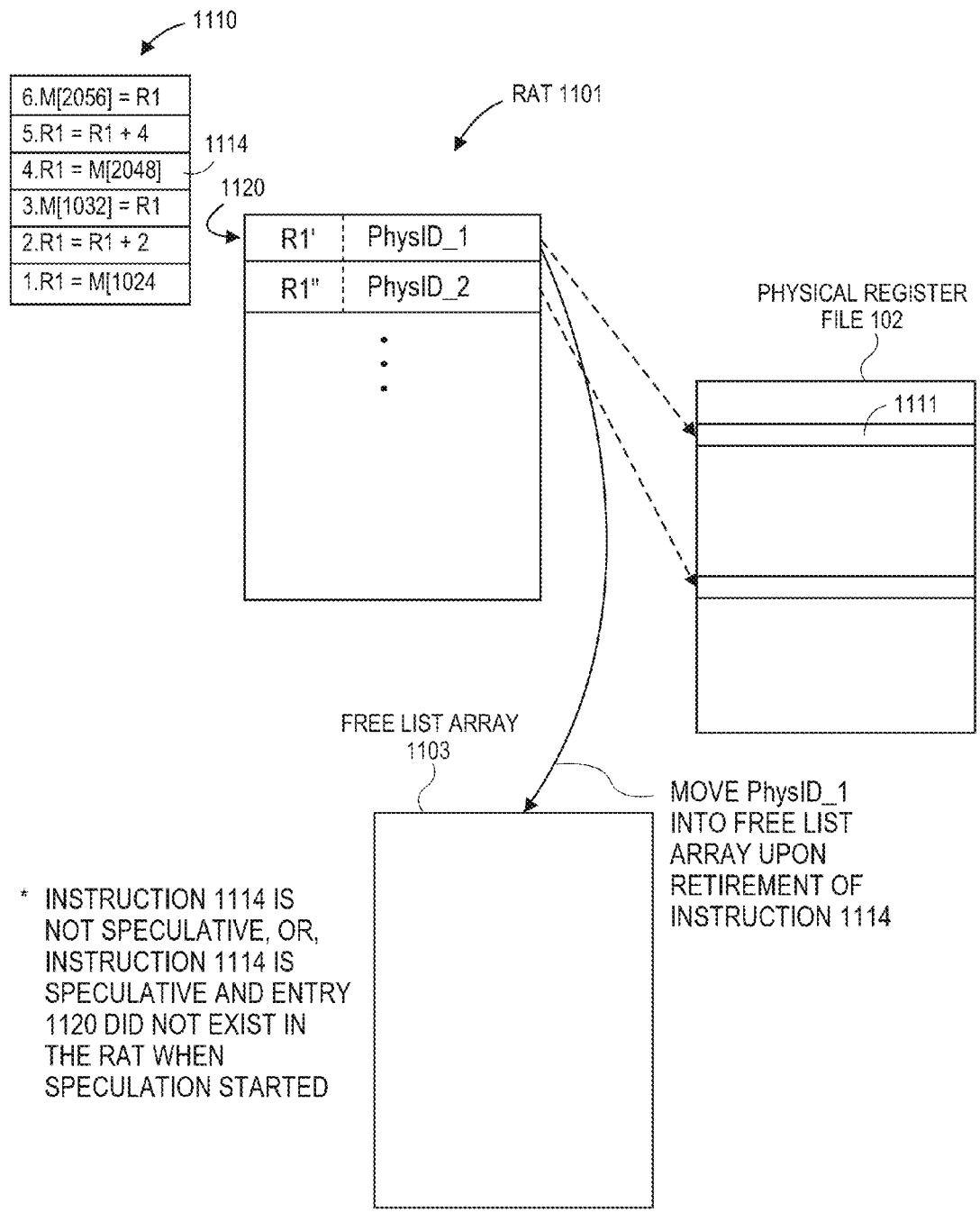
Figure 11B:
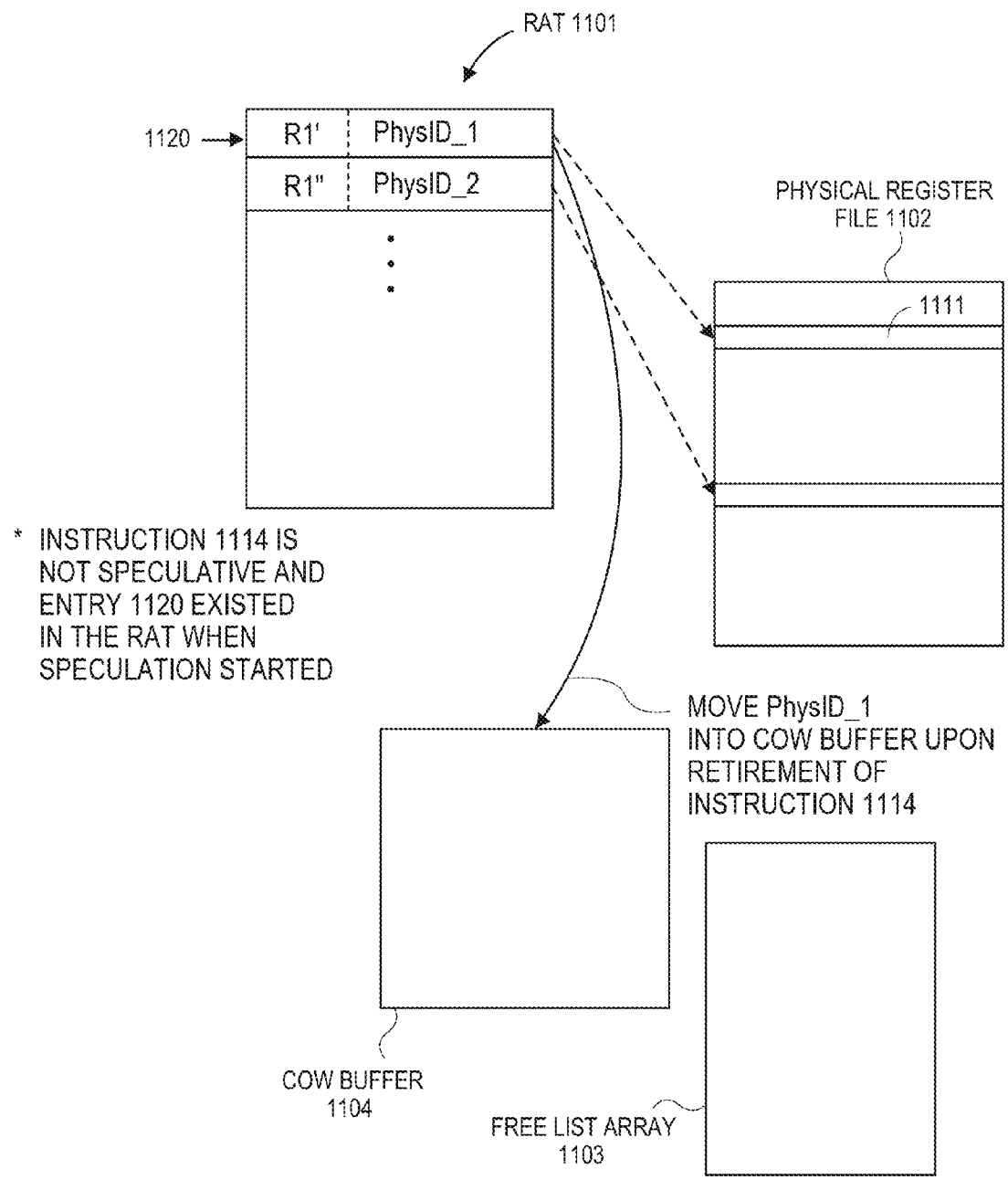
FIG. 11b shows logic circuit components for performing the process of FIG. 10b.

According to traditional register renaming behavior, referring to FIGS. 10a and 11a, upon retirement of an overwriter instruction 1114, the entry 1120 in the RAT 1101 for the retired version of a renamed register 1111 whose information was supposed to be overwritten is deleted 1001 from the RAT 1101, and, the entry's pointer 1112 to the physical register space 1111 is moved 1002 to the free array list 1103. This has the effect of freeing up register space 1111 for subsequent overwriting.

By contrast, in an embodiment, referring to FIGS. 1 Ob and 11 b, this behavior is not followed when the overwriter instruction 1114 is extended speculatively executed and retired and is attempting to overwrite an older version of a renamed register that had an existing entry 1120 in the RAT 1101 that was carried over from the non speculative to the speculative code regions. In the case of a speculative overwriter instruction that is to overwrite information having an entry in the RAT that was carried over from the non-speculative to the speculative code regions, the entry's pointer 1112 to the physical register space 1111 is not moved to the free array list 1103 when overwriter instruction 1114 retires. Rather, it is moved 1004 to a copy-on-write (COW) buffer 1104.

In a further embodiment, the pointer 1112 is appended or otherwise linked to the architectural register (R1) that it was associated with in the RAT (e.g., the information of the entire entry 1120 is stored in the COW buffer 1104). Here, by preventing the pointer 1112 from entering the free list array 1103, the corresponding physical register space 1111 cannot be overwritten by subsequently executed speculative code. By also saving the identity of the pointer's corresponding architectural register, the state information of the RAT 1101 for that entry 1120 at the end of non speculative execution is essentially being saved. By treating each entry that existed in the RAT 1101 that was consistent with the point in the program when non-speculative execution ended in the same fashion, the entire contents of the RAT 1101 as of the end of non speculative execution is essentially saved in the COW buffer 1104. As such, if needed, the machine can roll-back and restart execution from that state if the speculative execution needs to be discarded.

Thus, to reiterate, in an embodiment, only the entries that exist in the RAT 1101 consistent with a point in the program when speculative execution is started have their pointers to physical register space (and, associated logical register names) specially saved to the COW buffer 1104. Subsequent entries that are created in the RAT for the (potentially extensive) speculatively executed code have their pointers moved to the free array list 1103 upon the retirement of an overwriter consistent with the processes of FIGS. 10*a* and 11*a*. By so doing, state information in physical register space 1111 reflecting a point in program consistent with the end of non speculative execution is saved thereby permitting program execution to roll-back back to that state should the speculative execution need to be discarded. For extended speculation, in one embodiment, branches are resolved before they retire in the traditional speculation portion of the machine. Here, traditional speculation corresponds to speculation within the depth/size of the reorder buffer. Not specially saving RAT information for RAT entries that are not carried over from the non-speculative region to the speculative region is acceptable regardless if the traditional speculation follows the correct program code path or not. The physical register associated with RAT entry 1120 is not moved to the free list array 1103 or the COW buffer 1104 until the overwriter retires, by which time all prior branches must have been resolved, and correct program code path determined. On a branch misprediction in the traditional speculation portion of the machine, the RAT 1101 deletes the mappings to physical registers associated with instructions on the incorrect path, returns their allocated physical registers to the free list array 1103, and restores as current the mappings between architectural registers and physical registers, including information about which current RAT 1101 entries were carried over from the non speculative region to the speculative region, to the point immediately after the mispredicting branch on the correct path. In another embodiment branch direction is not resolved until after traditional speculation has retired but before extended speculation has committed. In this case, some physical registers may have been returned to the free list array 1103 that might be needed on the correct path, and thus the whole extended speculation region must be discarded, the RAT 1101 restored from the COW buffer 1104, and execution resumed from the restored-state.

Figure 12:
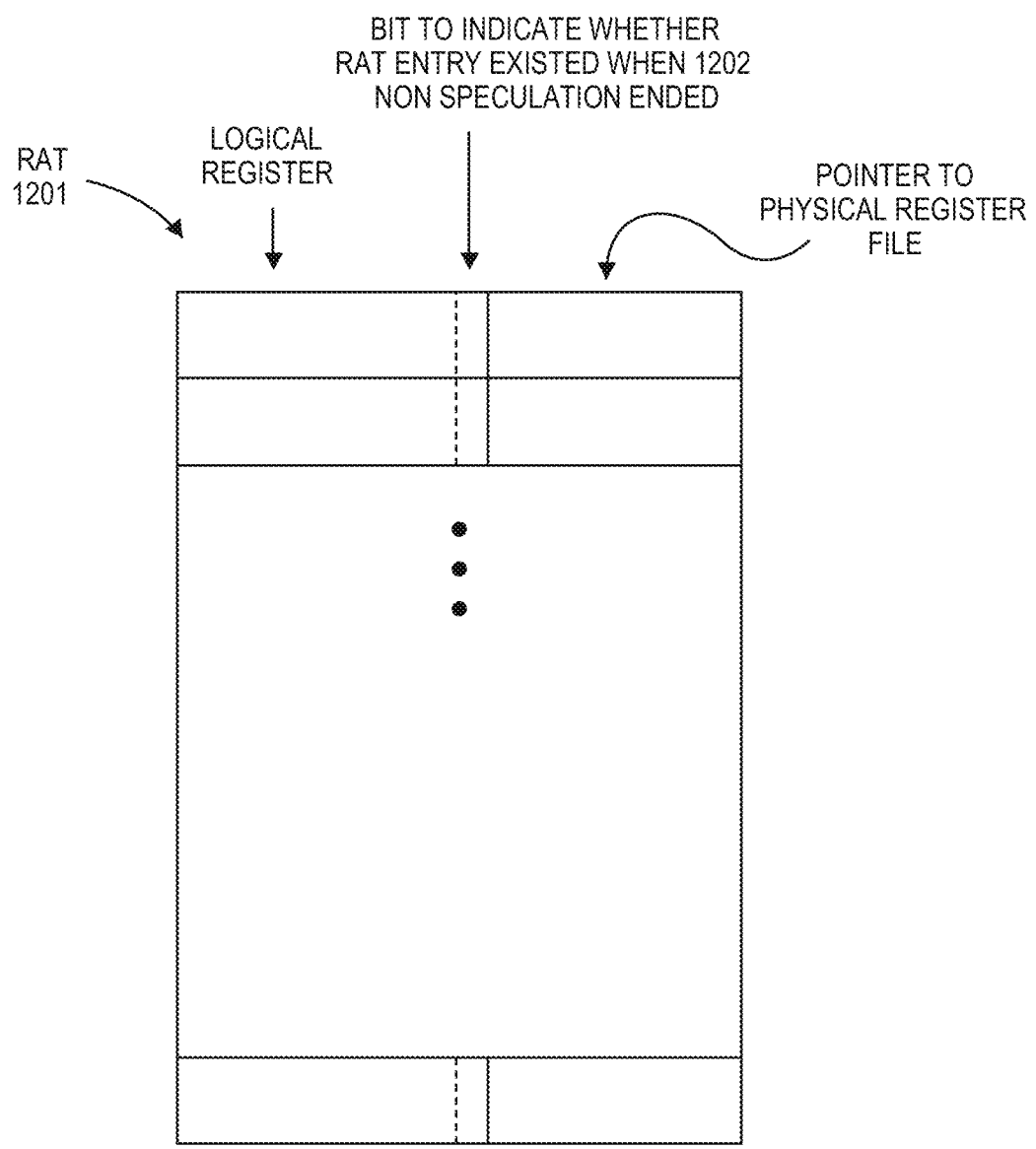
FIG. 12 shows a RAT having a bit for each entry to indicate whether the entry existed in the RAT at the end of non speculative execution.

In an embodiment, as observed in FIG. 12, each entry in the RAT 1201 is provided with a bit 1202 to indicate whether or not the entry corresponds to an entry that was carried over in RAT 1201 from the non speculative region to the speculative region. If the bit of an entry is set to indicate that the entry was carried over in the RAT 1201 from the non speculative region, the entry is treated according to the processes discussed above with respect to FIGS. 10*b* and 11*b*. By contrast, if the bit of an entry indicates that the entry was not carried over in the RAT 1201 from the non-speculative region, the entry is treated according to the processes of FIGS. 10*a* and 11*a*. By definition, any new entry that is entered into the RAT 1201 during the execution of extended speculative code does not have its bit set, thus indicating that it was not carried over from the non-speculative region to the speculative region. This effectively ensures that only the RAT state consistent with a point in the program at the end of non speculative execution is saved across a non speculative/speculative code boundary.

Figure 13:
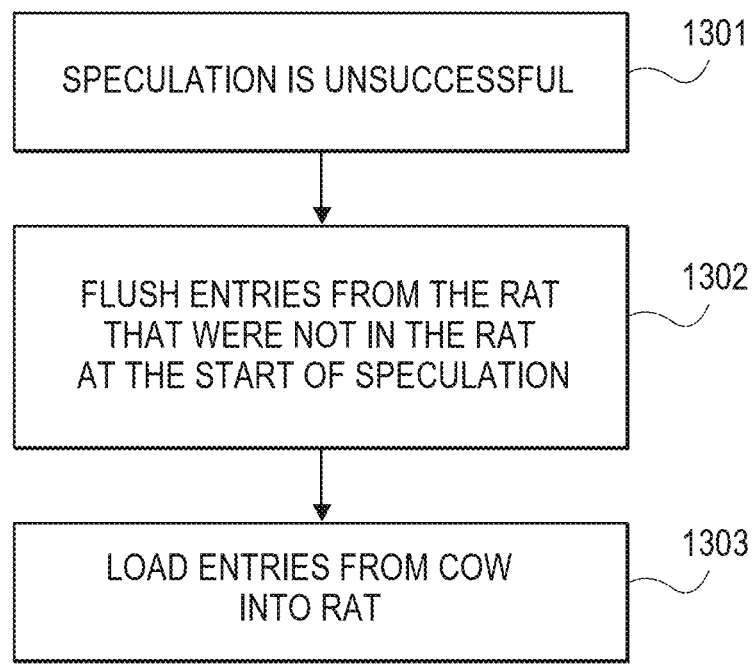
FIG. 13 shows a process for restoring RAT information from a COW buffer in order to rollback program state from a speculative region to a non speculative region.

Referring to FIG. 13, if the speculation is deemed unsuccessful 1301, a "pipeline nuke" is performed to clear the pipeline of any state information associated with traditional speculative code. This process will restore the RAT to be consistent with the current retirement point in the re-order buffer. Any results in the re-order buffer that were determined speculatively through traditional speculation may also be flushed from the re-order buffer, and their corresponding physical registers identifiers returned to the free list array. Then, the RAT entries that were not carried over from the non-speculative region to the speculative region are flushed from the RAT 1302. Here, any pointers of such entries are returned to the free array list to permit their associated information in the physical register file to be overwritten. The saved RAT entries within the COW are then re-populated back into the RAT to restore the RAT to a point in the program just before speculation started 1303. So doing has the effect of rolling back program execution to its last non-speculative point.

The physical register file 1102 discussed above is typically used to hold operand data and resultants of "mathematical and/or logic" operations performed on the operands. There are typically two kinds of such operands/resultants: integer and floating point. Here, physical register space 1102 may be viewed as corresponding to one or the other or both depending on implementation. Other kinds of information may be stored in register space that is typically not associated with the operands/resultants of standard mathematical/logic operations. Examples include control or control-like information kept in model specific register (MSR) space, and/or control and/or status flag register space used to help direct program flow (e.g., an MXCSR register that stores program directives, flags and masks (e.g., underflow mask, overflow mask, round-to-zero, round positive, round to nearest, precision flag, etc.). Again, register file 1102 may be presumed to include such registers.

Normally, however, program control register space such as the contents of an MXCSR register is not the type of register space associated with register renaming and out-of-order execution. Therefore there may not be any entry in a RAT for a mapping to a specific version or physical register, even though it is part of the state of executing program code. In other embodiments, these types of registers may be versioned and renamed into a separate physical register file that is separate from the physical register file used for data. Further this physical control register file may not be of sufficient size or may not be of a sufficient organization (e.g., an array of physical entries organized as a properly ordered list) to preserve overwritten versions until the speculative region commits while allowing additional entries for traditional speculative. As such in these embodiments, when the end of non speculative execution is recognized but before the start of execution of speculative program code, according to one embodiment, the allocation pipeline includes logic circuitry to automatically dump such program control content into temporary integer or floating point logical register space 1102 and create a corresponding entry in the RAT including the setting of the bit to indicate the entry was present in the RAT as of the end of non speculative execution. By so doing, the program control state information of the code will also not be overwritten by the speculative code according to the processes discussed above with respect to FIGS. 10*b*, 11*b* and 12. If the speculation is to be discarded and the program returned to its last state prior to the start of speculation, after the RAT is repopulated with the contents from the COW buffer, the entry corresponding to the program control state information is dumped back into its appropriate register space by special logic circuitry of the pipeline. Note that throughout extended speculation, the pointer to the saved copy of the MXCSR register may reside in RAT 1120. Only if the same temporary register is overwritten inside the extended speculation region will the pointer to the physical register containing the saved copy of the MXCSR register be moved into the COW. In another embodiment, the allocation pipeline may insert micro-operations into the pipeline that perform the dump into the temporary registers. In a further embodiment, an architectural instruction that signals the beginning of extended speculation may include dedicated micro-operations to perform the dump into the temporary registers.

In a similar vein, certain areas of "same" defined register space can exist in different physical locations. For example, 8-bit AH register space, which is logically bits 8-15 of parent register RAX, may be stored in a different physical location than the 8 bit allocation for it within its parent RAX register. As such, in an embodiment, prior to the start of speculation, the separately stored AH portion is combined back into its RAX parent by special logic circuitry so that only one RAT entry and one physical register contain all of the RAX data, and, only one COW entry would need to be created for the RAX and AH data items if RAX (and therefore implicitly AH) is overwritten inside the extended speculation region rather than two. If the speculative code has to be rolled back to the end of non speculative state, the pipeline includes special logic circuitry that can separately store the AH information from the RAX register space to reflect the state of the code at the end of its non speculative region. In another embodiment, the RAT will be restored with the mapping of RAX to the single combined physical register, and an indication set in the RAT that AH is not separate and currently comprehend in physical register mapped to RAX. Like with control register state, the merge may be performed by dedicated allocation pipeline circuitry, by micro-operations inserted by the allocation engine, or by dedicated micro-operations included in the micro-operation flow of instructions that indicate the start of extended speculation.

Furthermore, even though the RAX parent is combined at the beginning of the speculative region, the AH information might be written alone inside the speculative region (thus creating a COW entry mapping AH to its old physical register). Note, however, that the RAT still holds a mapping from RAX (minus the AH part) to the same physical register. If RAX is written to later in the speculative region, the mapping of RAX to the same physical register will be moved to the COW. So the COW will have AH and RAX in two records pointing to that same physical register. Note that this is the last reference to that physical register, but by the processes of FIGS. 10*b*/11*b*, that physical register will not be returned to the freelist. Note that there would have been additional cases if AH and RAX could have started the speculative region as two different physical entries.

Architectural result flags of a carry flag ('C') group and different result flag components of an overflow/sign/parity/auxiliary/zero flag ('OSPAZ') group can also similarly be combined into a single register location just prior to entering a speculative code region. As such, isolated pieces of register state, even including mathematical/logic state, may be combined into same register space just prior to entry into a speculative code region to reduce COW entry overhead.

Figure 14:
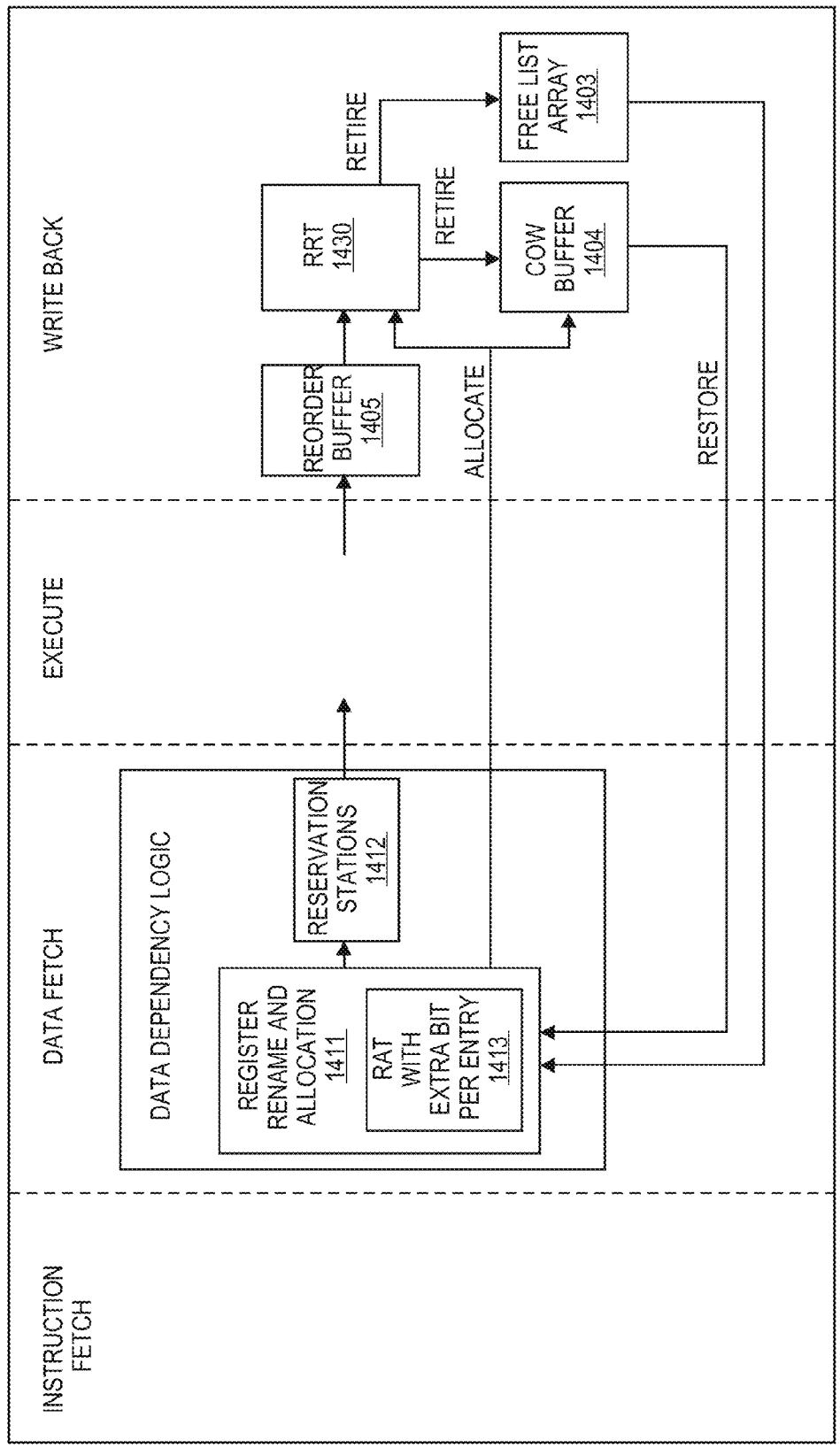
FIG. 14 shows a pipeline having a COW buffer in a write back stage of a pipeline.

FIG. 14 illustrates architectural components employed in one embodiment which include a register rename and allocation logic 1411 and reservation station 1412 at the data fetch stage, and a ROB 1405, register reclaim table (RRT) 1430, COW buffer 1404, and free list array 1403 at the write back stage. The discussion above has primarily contemplated the presence and control of the free list array within the data fetch stage, assuming that the RAT 1413 tracks all in-flight versions of each architectural register including the retired version. In the implementation shown in FIG. 14, the free list array 1403 is managed by logic circuitry of the write back stage in conjunction with the operation of the RRT 1430 which keeps track of the in-flight (allocated) over-writer instructions whose retirement represents that no dependencies exist on the respective information that the over-writer instruction over-writes in the original, strictly ordered program code. This structure is written when an over-writer allocates into the RAT, and read when the over-writer retires. Without extended speculation, physical register identifiers read from the RRT upon retirement represent physical registers that can be returned to the free list array, as described in FIGS. 10*a* and 11*a*.

For each such over-writer instruction, the RRT 1430 lists the pointers into physical register space where the information that the over-writer overwrites in the original code resides. Thus, upon retirement of a non speculative over-writer instruction, the instruction's corresponding pointer in the RRT 1430 is flushed from the RRT 1430 and entered into the free list array 1403. Notably, in the particular embodiment of FIG. 14, the free list array 1403 and COW buffer 1404 are located in the write-back pipeline stage as opposed to the data fetch pipeline stage (although each or one or the other could conceivably be located in the data fetch stage). In an embodiment, in order to support extended speculative execution, similar to the discussion of FIG. 12, each entry in the RRT may include a bit that indicates whether the RAT mapped an architectural register to a physical register that carried over from the non speculative region to the speculative region. As a physical register identifier is replaced from the RAT due to an overwriter, it is placed into the RRT corresponding to the overwriter, and the bit associated with the RAT entry specifying whether it was present at the end of the non-speculative execution is copied into the RRT along with the physical register identifier. Retirement of a speculative overwriter, as a consequence of the set bit, causes the corresponding pointer that is flushed from the RRT to be entered into the COW 1404 rather than the free list array 1403.

In an alternate embodiment, a second RAT (not shown in FIG. 14, also referred to as a Retirement RAT (RRAT)) is located in the write-back stage, whereas the primary RAT is located in the allocation or data fetch stage. The primary RAT tracks the mapping between architectural registers and physical registers during renaming, whereas the retirement RAT in the write-back stage tracks the mapping between architectural and physical registers representing the retired state in program order. When an over writer retires, the over written physical register pointer can be moved from the second RAT to the freelist or to the COW, depending on the processes of FIGS. 10*a*/11*a* and 10*b*/11*b*.

In an alternative embodiment, rather than have an extra bit for each RRT entry, a separate data structure (not shown in FIG. 14) is used to keep track of the non speculative state information (that is, information that would need to be restored if state must be rolled back due to incorrect extended speculation) that could be overwritten by speculative code if precautions are not undertaken. For example, a non speculative RRT may exist that is separate from the RRT. Upon allocation of a speculative overwriter that could overwrite non speculative state information needed for rollback, an entry is created in the non speculative RRT with a pointer to the impacted non speculative state information (and an identifier of the associated architectural register). In an embodiment, the creation of the entry may include shifting an entry that existed at the end of non speculative execution within the RRT from the RRT to the non speculative RRT.

Speculative overwriters that do not affect non speculative state needed for rollback have entries created in the normal RRT rather than the non speculative RRT. Upon retirement of a speculative overwriter instruction that can impact non speculative state, the pointer to the physical register space in the corresponding non speculative RRT entry is automatically moved to the COW (along with the identifier of the logical register). According to one embodiment, both the normal RRT and the non speculative RRT are contained within the traditional speculative portion of the machine. Both are corrected in response to branch misprediction by eliminating entries for overwriters that were on the wrong path. Upon retirement of an overwriter, the overwritten physical registers that are no longer needed as stored in the RRT are moved to the freelist, and the physical registers that must be preserved in case of a rollback as stored in the non speculative RRT are moved into the COW. According to one embodiment, the RRT and the freelist may be a single structure with a pointer that distinguishes the portion representing the RRT and the portion representing the freelist, whereas the pointer is advanced upon retirement of an overwriter effectively moving physical register identifiers from the traditional speculation engine (RRT) portion to the free list portion. Similarly, the non speculative RRT and the COW may be a single structure with a pointer that distinguishes the portion representing the non speculative RRT and the portion representing the COW, whereas the pointer is advanced upon retirement of an overwriter effectively moving physical register identifiers from the traditional speculation engine (non speculative RRT) portion to the COW portion. Because the COW essentially protects a certain amount of register space from overwriting during speculation, the size of the COW can be viewed as setting a limit on how far speculative code can progress in terms of overwriting non speculative state information. In order to reduce COW size, one approach is to permit speculation only for a certain type of register. For example, according to one approach, the COW is designed to support extended speculation for integer registers but not floating point registers. As such, extended speculation can proceed until a first floating point register is used by the speculative code. Upon reaching the first extended speculative instruction that attempts to modify a register type that cannot be modified during extended speculation, an atomic commit is forced upon any speculative retired but not committed instructions. If the atomic commit is not possible, the speculation is rolled back to its last non speculative state.

Note that the above discussion has focused on a circuitry designs for a single thread. Support for speculation for each of multiple threads could be effected by instantiating a separate instance of such circuitry for each of the multiple threads and/or storage for the associated context of each thread.

Upon atomic commit of the extended speculative region, the physical registers mapped by pointers in the COW 1404 no longer need to be preserved because there is no further risk of a rollback. After the commit, the physical register identifiers from the COW can be moved to the free list.

Techniques for Continued Retire During Commit

The extended speculation mechanisms described above allow the size of the instruction region (number of instructions that may be executed prior to knowing whether to commit or abort the region) to exceed that of the reorder buffer used for conventional out-of-order speculation. The machine performs conventional (i.e., "traditional") speculation for high performance execution while retiring instructions within the region. As discussed above, the COW 1404 maintains copies of the architectural registers from the time the extended speculation mechanism began, thus providing a mechanism for restoring the architectural registers to pre-speculation values.

The region of code for extended speculation will be referred to below as the InTx (inside a transaction) region. In the architecture discussed above, the ROB was forced to stall retirement when a region commit uop was the oldest until the memory system (MEU) was prepared to commit values altered in the region. This process causes the out-of-order speculation mechanism to get "backed up" while waiting for the MEU. That is, at the time the commit operation is at the head of the ROB 1405 and ready to retire, its retirement is held back, thus preventing the ROB 1405 from retiring and speculating deeper into code subsequent to the region. Delay in the retirement of the commit causes delay in the retirement of subsequent uops, which delays releasing resources causing yet other sources of delay.

The embodiments of the invention described below allow continued retirement of instructions during a commit of a speculative region of program code. Specifically, one embodiment allows the retirement of instructions to proceed through the commit uop into post-region code even if the memory execution unit (MEU) 164 has not committed the region yet. The range of uops not normally InTx (not normally inside the extended speculation region) but included inside the region by the techniques described below is referred as the "Post-Tx" region. That is, the Post-Tx uops are considered to be part of the region itself. When retirement is allowed to proceed past the commit uop, but yet the region subsequently aborts because of a memory issue, the architectural register values must be restored to the point at the beginning of the region, throwing out both the region and post-region execution.

In one embodiment, this new mode ends when one of several conditions arises. First, if the beginning of a new region is ready to retire, retirement must stall until the previous region is ready to commit otherwise extra tracking is required for two regions to be in the process of committing simultaneously, which is added complexity especially in the MEU. Second, if a uop comes up for retirement that is not allowed inside of a region because its retirement cannot be undone by the copy-on-write (COW) mechanism described below, retirement must stall. Third, if the region actually commits, and there are no additional regions inside the conventional speculation mechanism, treating subsequent code as being inside the region is no longer necessary (this is referred to as "free and clear").

Figure 15:
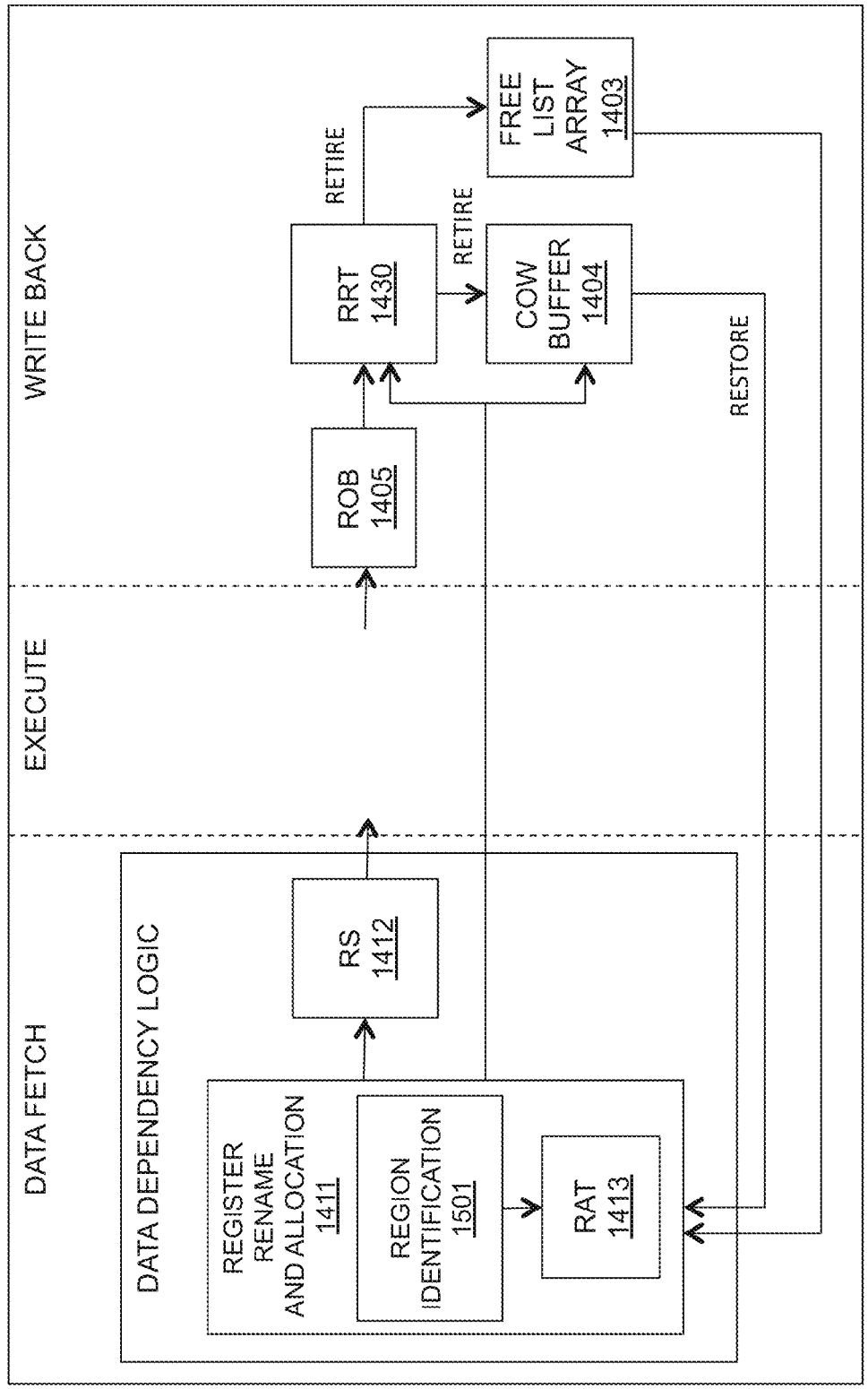
FIG. 15 shows a pipeline having a COW buffer in a write back stage of a pipeline and region identification logic in a data fetch stage.

FIG. 15 includes one embodiment of an architecture for continued retirement of instructions during a commit of a speculative region of program code. Unless otherwise stated, the components illustrated in FIG. 15 perform the same functions as those described above with respect to FIG. 14.

In one embodiment, the decisions related to the inclusion of uops inside regions are made at allocation time. Specifically, region identification logic 1501 within the register rename and allocation logic 1411 identifies InTx and post-Tx transactional memory regions and generates region indicators to identify these regions. As mentioned, the region indicator may treat the InTx and post-Tx regions as a single region.

Transactions may be delineated by begin and end instructions such as XBEGIN and XEND, respectively. In one embodiment, using this information, the region identification logic 1501 tags instructions with the region indicator. During this stage, a decision is made as to what storage location is to be used (such as a position in the load or store buffer of a MOB), an assignment of a physical register for use by the instruction (this may include register renaming), and which functional unit to use (if necessary). Regardless of how region indicator tagging is performed, region indicator information is subsequently stored within the ROB 1405.

FIGS. 16*a-b* illustrate an example where program order includes InTx Region 1, followed by a PostTx Region 1, further followed by an InTx Region 2. The diagram depicts an abstract view of the Reorder Buffer (ROB 1405), where program order runs left to right. The shaded region 1600 is the PostTx code, that is, instructions not normally considered part of a region. As mentioned, in one embodiment, the region identification logic 1501 in the RAT 1413 treats PostTx Region 1 1610 as part of the InTx region, putting overwritten values into the COW 1404 if the values were live across the boundary into InTx Region 1. In this Figure, the PostTx Region 1 is defined by the RAT 1413 and the ROB 1405 will send the RAT the commit signals described herein. In FIG. 16*a*, the region has not committed by the time the Begin of InTx of Region 2 has started allocation, thus the entirety of instructions between the two regions are considered PostTx, and the RAT includes them in Region 1.

In FIG. 16*a*, the region has not committed by the time the Begin of InTx Region 2 1605 reaches retirement. At this point, the Begin InTx of Region 2 serves as the actual commit point of Region 1, and retirement will be delayed until the combined InTx Region 1+the PostTx Region 1 have actually committed. Thus the ROB considered the entirety of InTx Region 1+the PostTx Region 1 to be in the region 1620. When this combined region commits, all of the COW entries for the combined InTx Region 1+the PostTx Region 1 have been accounted for as the overwriters that created them have been retired. The physical registers preserved in the COW 1404 for the combined region can all be moved to the free list array 1403 because the possibility of an abort has passed. The next entries in the COW 1404 will belong to InTx Region 2 and subsequent regions. Thus the RAT 1413 and ROB 1405 have equivalent views of what is PostTx and what is not.

In FIG. 16*b*, like in FIG. 16*a*, the region has not committed by the time the Begin of InTx of Region 2 has started allocation, thus the entirety of instructions between the two regions are considered PostTx, and the RAT includes them in Region 1. However, in FIG. 16*b* the region commits while in the middle of retiring PostTx Region 1 code. At this point, only some overwriters that created COW entries have retired and others have not. The ROB 1405 view of what was just committed is a subset of what the RAT 1413 marked (portion 1601 of PostTx Region 1 vs the complete PostTx Region 1 (portions 1601+1602)) 1630. When the combined InTx Region 1+the partial PostTx Region 1 (1601) have actually committed, the physical registers in those COW entries can be moved to the free list 1403. However, subsequent uops may have been considered PostTx at allocation time (by the RAT 1413) and created entries in the COW 1404 even though the ROB considers the transaction complete. When those overwriter uops retire, the physical registers held in those COW entries can be moved directly to the free list 1403; there is no more risk of an abort of the combined region. Note that this is equivalent to treating these COW entries (region 1602) as if they were actually in the RRT 1430 (as previously described). That is, as these overwriters retire, the physical registers do not need to be saved in case of an abort, and can be freed into the free list 1403. Even though the ROB 1405 is no longer in Tx, it should comprehend that RAT considered them in Tx and free the COW entries like it would RRT entries upon uop retirement.

Figure 16C:
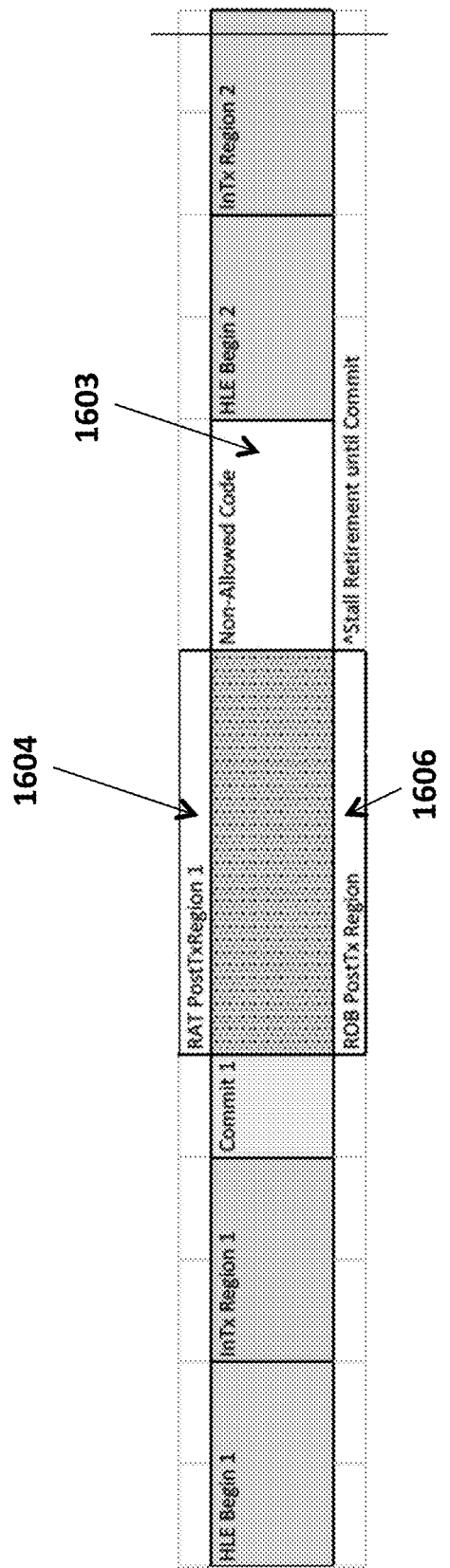

The third scenario illustrated in FIG. 16*c* is similar, except that the RAT 1413 can terminate a PostTx region 1604 when it encounters a non-allowed uop 1603. Where the non-allowed uop comes up for retirement prior to the combined region commit, retirement will stall on the not-allowed uop until the combined region does commit. The combined commit point is at the non-allowed uop. In one embodiment, where the commit occurs prior to the non-allowed uop coming up for retirement, the commit can proceed (as in FIG. 16*b*), but the ROB 1405 must free physical registers stored in the COW 1404 as retirement proceeds up to the point of the non-allowed uop within ROB PostTx Region 1606. Note that in the non-allowed code region 1603, the RAT 1413 will not put any physical registers into the COW 1404.

The fourth scenario is a special case where there are no subsequent regions or non-allowed uops in the conventional out-of-order mechanism when the combined region commits. Up to this point, the region identification logic 1501 has been marking uops as PostTx and can now stop because it is not possible for any further regions to abort. In this scenario, there is no case as in FIG. 16*a*, but the case in FIG. 16*b* still applies. After the commit, the region identification logic 1501 will stop marking uops as PostTx, and the ROB 1405 must free the physical registers held in the COW 1404 upon retirement of overwriters up to the point where the region identification logic 1501 stopped marking uops as PostTx. Considering branch misprediction and pipeline nukes, it is possible for the conventional speculative path to be considered PostTx, a branch mispredict to occur simultaneous with the commit, and then the newly allocated correct path be free-and-clear (non-PostTx). In one embodiment, the speculation mechanism described above repairs the COW 1404 such that uops allocated into the ROB 1405 prior to the commit will still have COW entries and be considered PostTx, COW entries created for wrong path uops will be eliminated and the incorrectly allocated physical registers returned to the free list 1403, and no COW entries are created for the non-PostTx uop allocations.

A method in accordance with one embodiment of the invention is illustrated in FIG. 17. The method may be implemented on the architecture illustrated in FIG. 15, but is not limited to any particular architecture.

At 1701, a plurality of transactional memory regions are identified within program code to be executed. For example, as mentioned above, each instruction may be tagged with a transactional memory region identifier. At 1702, one or more uops following one (or more) of the transactional memory regions are identified. As discussed above, the transactional memory region may be logically extended to include these uops (i.e., so that the "region" used for processing comprises the transactional memory region+the post-region uops). At 1703, one or more of the plurality of uops which follow the transactional memory region (i.e., in the post-region code) are allowed to retire following execution even if a commit operation associated with the transactional memory region is waiting to complete (e.g., due to memory latency in the pipeline). Thus, as discussed above, rather than stalling the pipeline until the commit has completed, this embodiment of the invention allows additional uops in the post-region code to retire, thereby improving performance.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method implemented in a processor comprising:
   identifying a plurality of transactional memory regions in program code, including a first transactional memory region; and
   retiring one or more of plurality of operations which follow the first transactional memory region even when a commit operation associated with the first transactional memory region is waiting to complete, wherein the commit operation associated with the first transactional memory region includes at least one speculative execution, wherein the one or more of plurality of operations that follow the first transactional memory region are treated as part of the first transactional memory region so that states of architectural registers of the processor from execution of the first transactional memory region and the one or more of the plurality of operations are preserved.

2. The method as in claim 1 wherein the operations are microoperations (uops).

3. The method as in claim 1 further comprising:
   stalling a retirement operation of a current transactional memory region until a previous transactional memory region is ready to commit.

4. The method as in claim 1 further comprising:
   detecting an abort operation to abort execution of the plurality of operations following the first transactional memory region; and
   restoring the architectural registers to a state existing at a start of the first transactional memory region; and
   discarding results from the first transactional memory region and/or the plurality of operations following the first transactional memory region.

5. The method as in claim 4 wherein restoring the architectural registers comprises reading data associated with the state from a copy-on-write (COW) buffer.

6. The method as in claim 1 further comprising:
   detecting that retirement of an operation of the plurality of operations following the first transactional memory region would result in the inability to restore the architectural registers to a state existing at a start of the first transactional memory region; and
   responsively stalling retirement of the operation.

7. The method as in claim 6 wherein detecting comprises detecting that retirement cannot be undone by restoring the architectural registers from a copy-on-write (COW) buffer.

8. A processor comprising:
   first logic to identify a plurality of transactional memory regions in program code, including a first transactional memory region; and
   second logic to retire one or more of a plurality of operations which follow the first transactional memory region even when a commit operation associated with the first transactional memory region is waiting to complete, wherein the commit operation associated with the first transactional memory region includes at least one speculative execution,
   and wherein the first logic and second logic treat the plurality of operations that follow the first transactional memory region as part of the first transactional memory region for the purposes of retiring operations so that states of architectural registers of the processor from execution of the first transactional memory region and the one or more of the plurality of operations are preserved.

9. The processor as in claim 8 wherein the operations are microoperations (uops).

10. The processor as in claim 8 wherein the second logic stalls a retirement operation of a current transactional memory region until a previous transactional memory region is ready to commit.

11. The processor as in claim 8 comprising additional logic to:

detect an abort operation to abort execution of the plurality of operations following the first transactional memory region; and restore the architectural registers to a state existing at a start of the first transactional memory region; and discard results from the first transactional memory region and/or the plurality of operations following the first transactional memory region.

12. The processor as in claim 11 further comprising:
a copy-on-write (COW) buffer, wherein restoring the architectural registers comprises reading data associated with the state from the COW buffer.

13. The processor as in claim 8 comprising additional logic to:
detect that a retire operation of the plurality of operations following the first transactional memory region would result in the inability to restore the architectural registers to a state existing at a start of the first transactional memory region; and
responsively stall retirement of the operation.

14. The processor as in claim 13 wherein detecting comprises detecting that retirement cannot be undone by restoring the architectural registers from a copy-on-write (COW) buffer.

15. A system comprising:
a memory for storing program code and data;
a input/output communication interface for communicating with one or more peripheral devices;
a network communication interface for communicatively coupling the system to a network; and
a processor comprising:
first logic to identify a plurality of transactional memory regions in program code, including a first transactional memory region; and
second logic to retire one or more of a plurality of operations which follow the first transactional memory region even when a commit operation associated with the first transactional memory region is waiting to complete, wherein the commit operation associated with the first transactional memory region includes at least one speculative execution, and wherein the first logic and second logic treat the plurality of operations that follow the first transactional memory region as part of the first transactional memory region for the purposes of retiring operations so that states of architectural registers of the processor from execution of the first transactional memory region and the one or more of the plurality of operations are preserved.

16. The system as in claim 15 wherein the operations are microoperations (uops).

17. The system as in claim 15 wherein the second logic stalls a retirement operation of a current transactional memory region until a previous transactional memory region is ready to commit.

18. The system as in claim 15 wherein the processor comprises additional logic to:
detect an abort operation to abort execution of the plurality of operations following the first transactional memory region; and
restore the architectural registers to a state existing at a start of the first transactional memory region; and
discard results from the first transactional memory region and/or the plurality of operations following the first transactional memory region.

19. The system as in claim 18 wherein the processor further comprises:
a copy-on-write (COW) buffer, wherein restoring the architectural registers comprises reading data associated with the state from the COW buffer.

20. The system as in claim 15 wherein the processor comprises additional logic to:
detect that a retire operation of the plurality of operations following the first transactional memory region would result in the inability to restore the architectural registers to a state existing at a start of the first transactional memory region; and
responsively stall retirement of the operation.

21. The system as in claim 20 wherein detecting comprises detecting that retirement cannot be undone by restoring the architectural registers from a copy-on-write (COW) buffer.

* * * * *